(12) United States Patent
Okana et al.

(10) Patent No.: US 7,204,547 B2
(45) Date of Patent: Apr. 17, 2007

(54) AUTOMOBILE UNDERBODY STRUCTURE

(75) Inventors: Fumio Okana, Fuchu-cho (JP);
Noritaka Sakiyama, Fuchu-cho (JP);
Yukiichirou Shimada, Fuchu-cho (JP);
Shigeyuki Mori, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/228,309

(22) Filed: Sep. 19, 2005

(65) Prior Publication Data
US 2006/0066138 A1    Mar. 30, 2006

(30) Foreign Application Priority Data
Sep. 29, 2004  (JP)  .............................. 2004-284894
Sep. 29, 2004  (JP)  .............................. 2004-284895

(51) Int. Cl.
*B60K 7/00*  (2006.01)
(52) U.S. Cl. ................... 296/204; 296/203.01
(58) Field of Classification Search ................ 296/204, 296/203.01, 203.02, 203.04, 193.07
See application file for complete search history.

(56) References Cited

U.S. PATENT DOCUMENTS

| | | | | |
|---|---|---|---|---|
| 2,668,722 A | * | 2/1954 | Muller | 296/204 |
| 3,791,472 A | * | 2/1974 | Tatsumi | 296/204 |
| 4,129,330 A | * | 12/1978 | Schwuchow | 296/204 |
| 4,557,519 A | * | 12/1985 | Matsuura | 296/204 |
| 5,048,888 A | * | 9/1991 | Willy et al. | 296/204 |
| 5,085,484 A | * | 2/1992 | Mori | 296/204 |
| 5,806,918 A |   | 9/1998 | Kanazawa | |
| 6,299,240 B1 | * | 10/2001 | Schroeder et al. | 296/204 |
| 6,540,286 B2 | * | 4/2003 | Takemoto et al. | 296/204 |
| 6,811,211 B2 | * | 11/2004 | Saito | 296/204 |
| 6,926,352 B2 | * | 8/2005 | Gotou et al. | 296/204 |
| 7,104,596 B2 | * | 9/2006 | Goto et al. | 296/204 |
| 2005/0082876 A1 | * | 4/2005 | Akasaka | 296/203.01 |
| 2005/0082878 A1 | * | 4/2005 | Yamada et al. | 296/204 |

FOREIGN PATENT DOCUMENTS

| | | |
|---|---|---|
| EP | 1 134 148 A2 | 9/2001 |
| GB | 1 314 470 | 4/1973 |
| JP | 11-78959 | 3/1999 |

* cited by examiner

*Primary Examiner*—Kiran B. Patel
(74) *Attorney, Agent, or Firm*—Nixon Peabody LLP; Donald R. Studebaker

(57) ABSTRACT

Disclosed is an underbody structure for an automobile, which comprises a pair of laterally-spaced floor frames 10 disposed to extend longitudinally in such a manner as to interpose a tunnel region 6 therebetween and joined to a bottom surface of a front floor portion 2. Each of the floor frames 10 has a rear end located in the vicinity of a rear kick-up portion 3 extending upward from a rear end of the front floor portion 2. The rear kick-up portion 3 and each rear end region of the floor frames 10 are connected to one another from the exterior side of the automobile through an end gusset 45 (47, 48). The end gusset 45 (47, 48) may be designed to define a closed section in cooperation with the rear kick-up portion 3, or to extend laterally outward so as to be connected to a front end region of a rear frame 17. The underbody structure of the present invention can prevent or suppress a rearward movement of each rear end of the floor frames during a head-on collision.

15 Claims, 16 Drawing Sheets

AUTOMOBILE UNDERBODY STRUCTURE

TECHNICAL FIELD

The present invention relates to an underbody structure for an automobile.

BACKGROUND ART

There has been known an automobile body comprising a floor panel which includes a front floor portion connecting a pair of laterally-spaced side-sills to one another and having a tunnel region extending longitudinally along the lateral center thereof, a rear kick-up portion extending upward from a rear end of the front floor portion, and a rear floor portion extending from an upper end of the rear kick-up portion rearward and approximately linearly. It is also generally known to provide a pair of laterally-spaced floor frames which are disposed to extend longitudinally in such a manner as to interpose the tunnel region therebetween, and joined to a bottom surface of the front floor portion, and a cross member which is disposed to extend laterally so as to connect each of the side-sills and the tunnel region, and joined to a top surface of the front floor portion. Typically, each of the floor frames is formed in an approximately reverse-hat shape in section, and joined to the front floor portion through a pair of laterally-spaced flanges thereof.

Further, as a commonly used technique, when a pair of laterally-spaced front frames are disposed in front of the floor panel, each of the floor frames is designed to be located on a rearward extension line of a corresponding one of the front frames, in top plan view, and connect a front end of the floor frame to a rear end of the front frame, so as to allow a rearward load during a head-on collision to be effectively transmitted from the front frame to the floor frame.

Generally, each of the floor frames is disposed to extend straight or linearly and parallel to a longitudinal axis of the automobile body, and intersect orthogonally with the cross member, in top plan view. While the following Patent Publication 1 (Japanese Patent Laid-Open Publication No. 11-078959) discloses a pair of laterally-spaced floor frames each gradually inclined laterally inward toward a rear end thereof, any technical meaning of inclining the floor frames as above is not disclosed therein because a technical problem recognized therein has no direct relation with the floor frames. It would be considered that each of the floor frames is designed to be simply located on a rearward extension line of a corresponding one of the front frames spaced from one another by a distance which is increased toward front ends thereof, because a technique disclosed in the Patent Publication 1 is characterized by employing a unique structure in which a subframe disposed between the pair of laterally-spaced front frames is formed in an approximately triangular shape widened toward a front end thereof in top plan view, and the front frames are spaced from one another by a distance which is increased toward the front ends thereof in conformity to the shape of the subframe (gradually inclined laterally outward toward the front ends thereof).

During a head-on collision, an impact load entered rearward into each of the front frames is transmitted to the corresponding floor frame. Typically, the rear end of the floor frame extending up to the vicinity of the rear kick-up portion is designed to maintain the approximately reverse-hat shape in section and have a rearward-facing opening, or to be in a so-called "as-cut state" where an as-cut section is exposed directly to the outside. This raised the need for preventing the occurrence of interference between the rear ends of the floor frames which are likely to be moved rearward during a head-on collision, and various devices and components located rearward relative to the rear kick-up portion.

SUMMARY OF THE INVENTION

In view of the above circumstances, it is therefore an object of the present invention to provide an automobile underbody structure capable of preventing or suppressing a rearward movement of the rear ends of floor frames during a head-on collision.

In order to achieve the above object, the present invention employs the following solutions.

As described in claim 1 of the appended claims, the present invention provides an underbody structure for an automobile, comprising: a floor panel which includes a front floor portion connecting a pair of laterally-spaced side-sills to one another and having a tunnel region extending longitudinally along the lateral center thereof, a rear kick-up portion extending upward from a rear end of the front floor portion, and a rear floor portion extending from an upper end of the rear kick-up portion rearward and approximately linearly; a pair of laterally-spaced floor frames disposed to extend longitudinally in such a manner as to interpose the tunnel region therebetween, and joined to a bottom surface of the front floor portion, wherein each of the floor frames has an approximately reverse-hat shape in section, and a rear end extending up to the vicinity of the rear kick-up portion; a pair of laterally-spaced front frames each having a rear end joined to a front end of a corresponding one of the floor frames; and an end gusset connecting each rear end region of the floor frames and the rear kick-up portion from the exterior side of the automobile.

According to the above solution, each rear end region of the floor frames can be connected to the rear kick-up portion through the end gusset to prevent or suppress a rearward movement of each rear end of the floor frames during a head-on collision. In addition, the end gusset makes it possible to provide enhanced rigidity in a region of the automobile body ranging from each rear end region of the floor frames to the rear kick-up portion.

As mentioned above, the present invention provides an automobile underbody structure capable of preventing or suppressing a rearward movement of each rear end of the floor frames during a head-on collision, and desirable in increasing the rigidity of an automobile body.

DETAILED DESCRIPTION OF THE INVENTION

Figure 1:
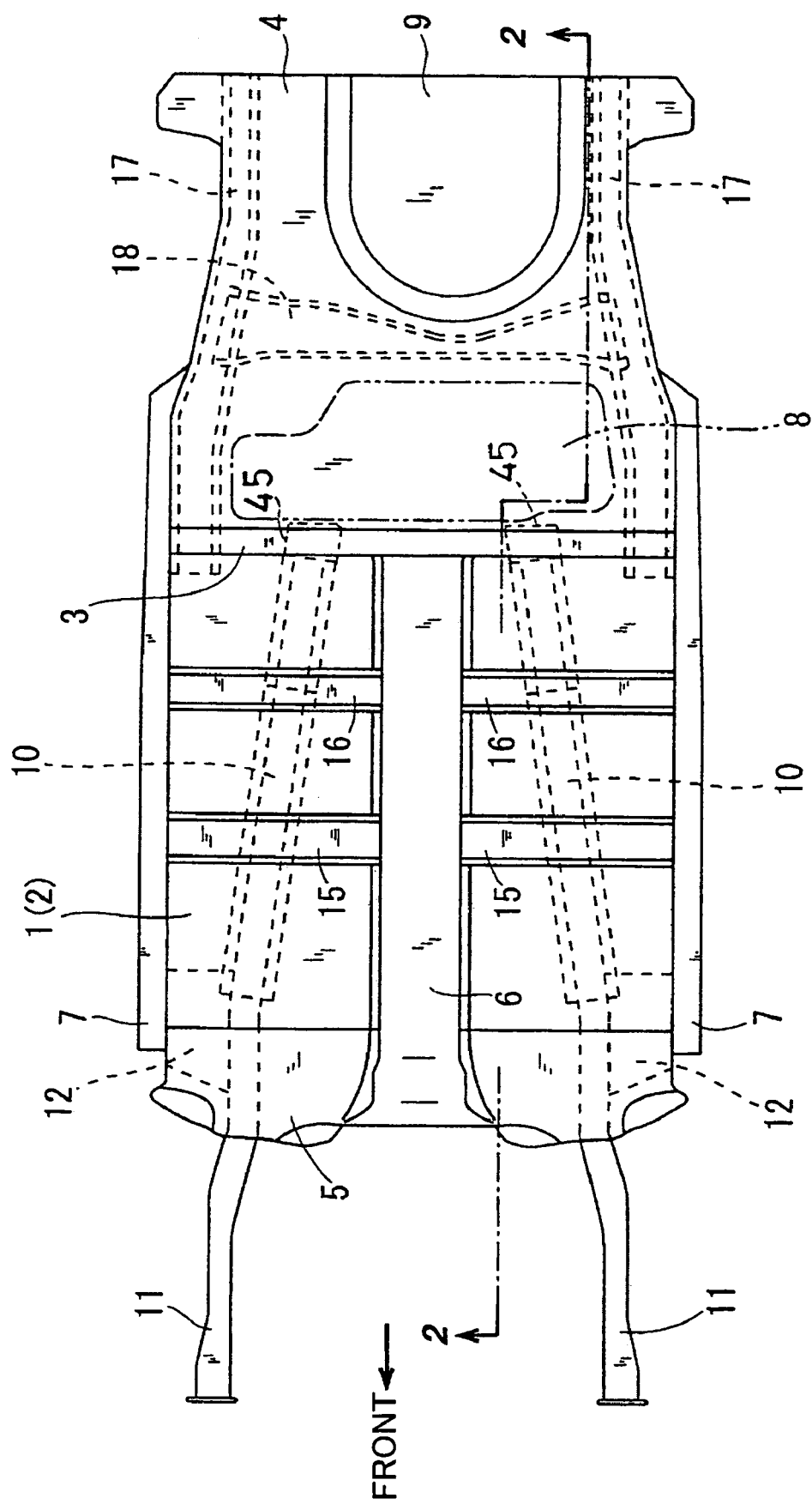
FIG. 1 is a top plan view of an automobile underbody structure according to a first embodiment of the present invention.
Figure 2:
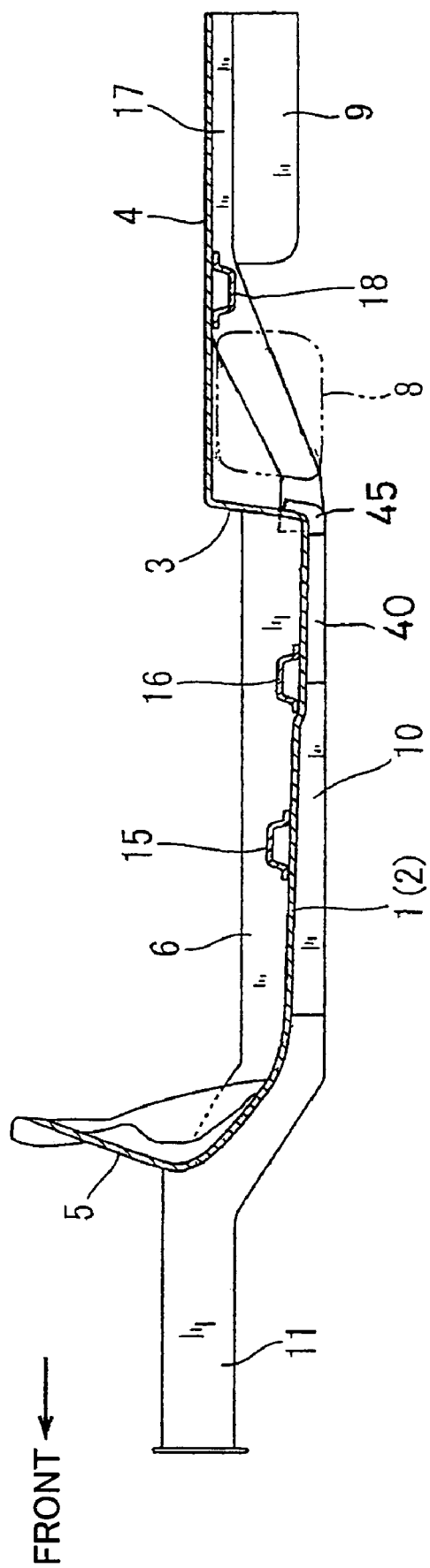
FIG. 2 is a sectional view taken along the line 2—2 in FIG. 1.

FIGS. 1 to 11 show an automobile underbody structure according to a first embodiment of the present invention. In FIGS. 1 and 2, the reference numeral 1 indicates a floor panel which is prepared by joining a plurality of panel members formed as longitudinally-divided pieces. This floor panel 1 generally comprises a front floor portion 2, a rear kick-up portion 3 raised upward from a rear end of the front floor portion 2 by a short distance, and a rear floor portion 4 extending rearward from an upper end of the rear kick-up portion 3. The front floor portion 2 has a front end connected to a lower end of a dash panel 5 extending vertically to separate between a passenger compartment and an engine room.

The front floor portion 2 is formed with a tunnel region 6 extending longitudinally and along the lateral center thereof. This tunnel region 6 has a front end (frontward opening) connected to the dash panel 5, and a rear end (rearward opening) connected to the rear kick-up portion 3. This front floor portion 2 has opposite lateral ends joined, respectively, to a pair of laterally-spaced side-sills 7 each extending longitudinally and serving as a strength member.

A fuel tank 8 is disposed just behind the rear kick-up portion 3 and immediately below the rear floor portion 4. A region of the rear floor portion 4 rearward relative to the fuel tank 8 is expanded downward to form a storage region 9 capable of storing a spare tire or the like therein.

Figure 3:
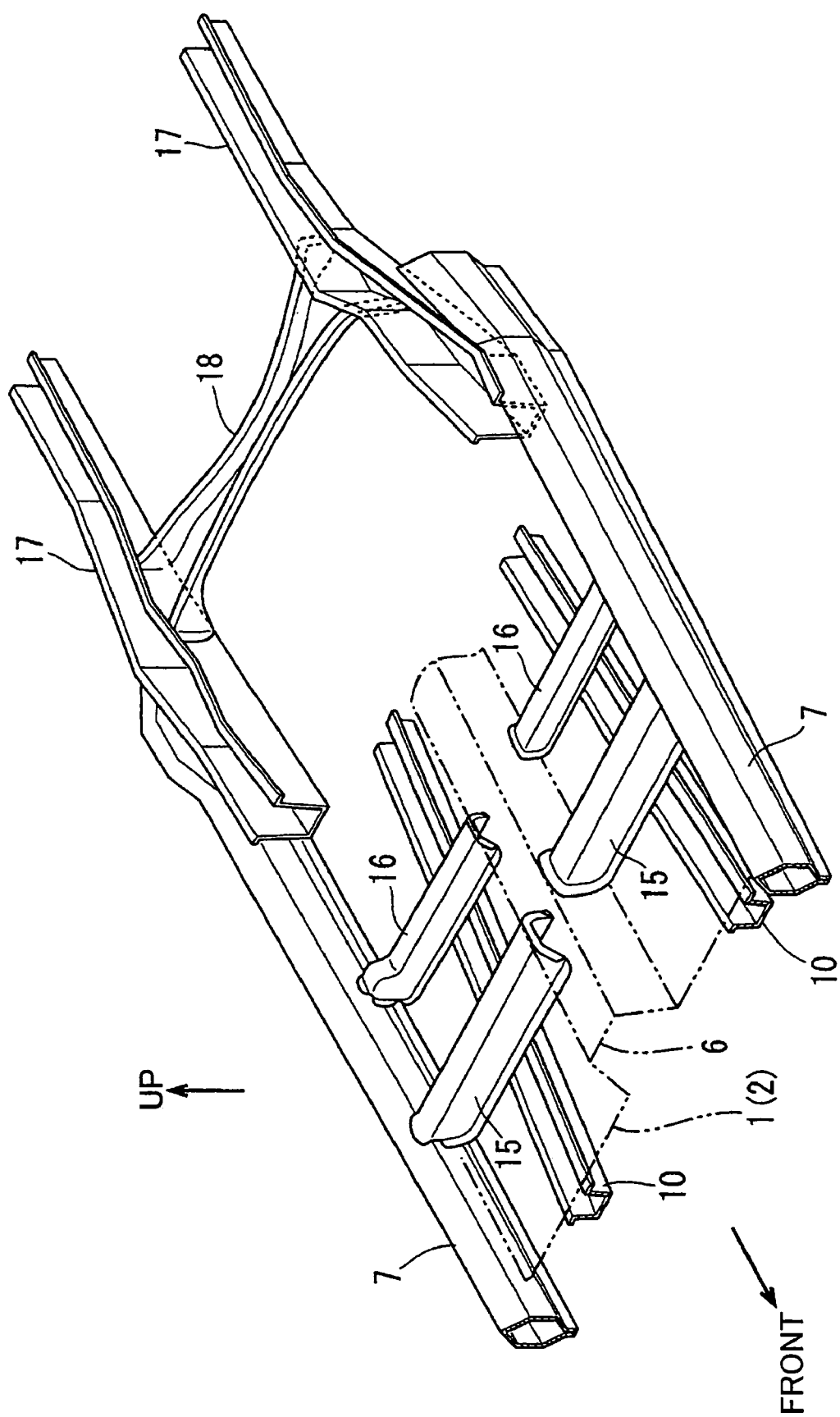
FIG. 3 is a perspective view showing an arrangement of strength members, such as a floor frame, a cross member, a side-sill and a rear frame, in FIG. 1.
Figure 4:
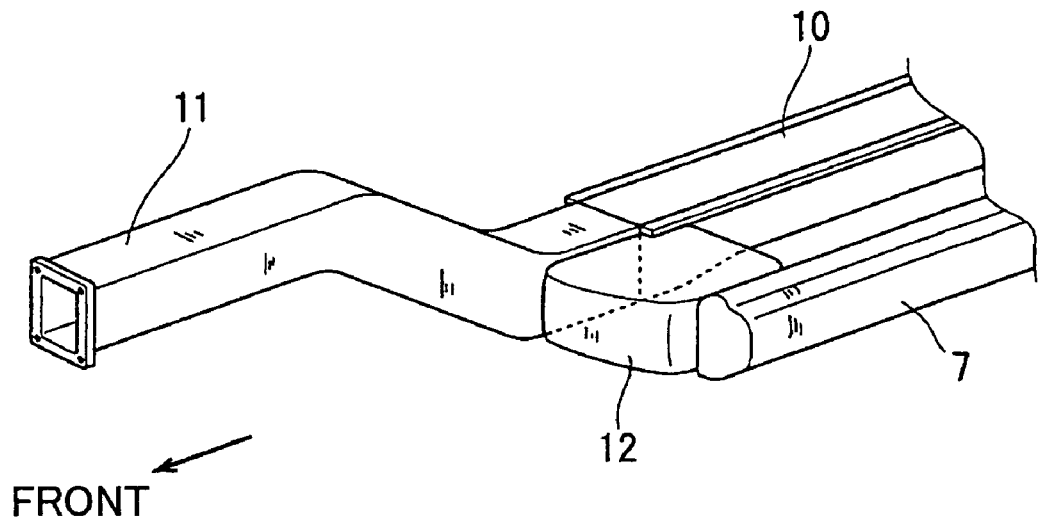
FIG. 4 is a perspective view showing a connected state of the floor frame, a front frame and the side-sill.

As shown in FIGS. 1 to 3, a pair of laterally-spaced floor frames 10 are joined to a bottom surface of the front floor portion 2, and the tunnel region 6 is located between the floor frames 10. Each of the floor frames 10 is arranged to be located between the tunnel region 6 and an adjacent one of the side-sills 7 in the lateral direction of an automobile body. While each of the floor frames 10 extends longitudinally and linearly as a whole, it is inclined relative to the longitudinal axis of the automobile body. More specifically, each of the floor frames 10 is gradually inclined laterally inward (to come closer to the tunnel region 6) toward a rear end thereof. That is, a lateral distance between respective front ends of the floor frames 10 is set to be greater than a lateral distance between respective rear ends of the floor frames 10. Each of the floor frames 10 is arranged to have the same angle of inclination. Each of the floor frames 10 is formed in a reverse-hat shape in section which has an upward opening, as described in detail later, so as to allow a closed section to be defined when each of the floor frames 10 is joined to the front floor portion 2. Further, the automobile understructure according to the first embodiment is provided with a pair of end gussets 45 designed to connect the rear ends of the corresponding floor frames 10 to the rear kick-up portion 3, and close up the rearward openings thereof, as described later. In FIG. 3, the end gussets 45 are omitted. Additionally referring to FIG. 4, each front end of the floor frames 10 is joined and connected directly to a corresponding one of rear ends of a pair of laterally-spaced front frames 11. Specifically, the pair of front frames 11 are disposed parallel to one another, and each of the front frames 11 is disposed parallel to the longitudinal axis of the automobile body (without inclination in top plan view). A lateral distance between respective rear ends of the front frames 11 is set to be approximately equal to the lateral distance between the front ends of the floor frames 10. This arrangement of the front frames 11 themselves is the same as that in a commonly-used underbody structure. This makes it possible to mount an engine (power train) using the front frames 11 in a conventional manner without change.

The rear end of each of the front frames 11 is designed to be located rearward relative to each front end of the side-sills 7. Then, a rear end region of the front frame 11, a front end region of the corresponding side-sill 7 and a front end region of the corresponding floor frame 10 are connected to each other by a torque box 12 serving as a strength member.

Two sets of longitudinally-spaced cross members 15, 16 are joined to a top surface of the front floor portion 2. Specifically, the first cross member 15 located at the frontward position is disposed at a longitudinally approximately intermediate position of the front floor portion 2, and the second cross member 16 located at the rearward position is disposed at an approximately intermediate position between the first cross member 15 and the rear kick-up portion 3. Each of the first and second cross members 15, 16 is composed of two sub-members laterally segmentalized by the tunnel region 6. Each of the first and second cross members 15, 16 connects each inward-facing surface of the side-sills 7 and an outward-facing surface of the tunnel region 6. Each of the first and second cross members 15, 16 is formed in an approximately hat shape in section which has a downward opening, so as to allow a closed section to be defined when each of the first and second cross members 15, 16 is joined to the front floor portion 2. As with a conventional underbody structure, each of the first and second cross members 15, 16 is disposed to extend in a direction orthogonal to the longitudinal axis of the automobile body, or obliquely disposed relative to each of the floor frames 10 in top plan view.

A pair of laterally-spaced rear frames 17 are joined to a bottom surface of the rear floor portion 4. Each of the rear frames 17 has a front end region joined to a corresponding one of rear end regions of the side-sills 7. These rear frames 17 are connected to one another at a position between the fuel tank 8 and the storage region 9 by a third cross member 18 which extends laterally. Each of the rear frames 17 is formed in a reverse-hat shape in section which has an upward opening, so as to allow a closed section to be defined when each of the rear frames 17 is joined to the rear floor portion 4.

Figure 5:
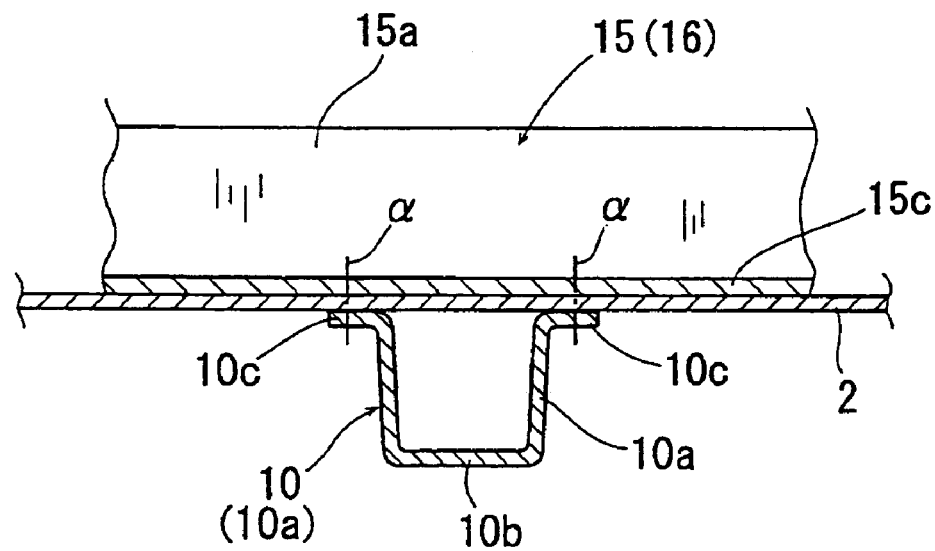
FIG. 5 is a sectional view showing a junctional relationship of the floor frame, the cross member and a front floor portion, taken along the line 5—5 in FIG. 6.
Figure 6:
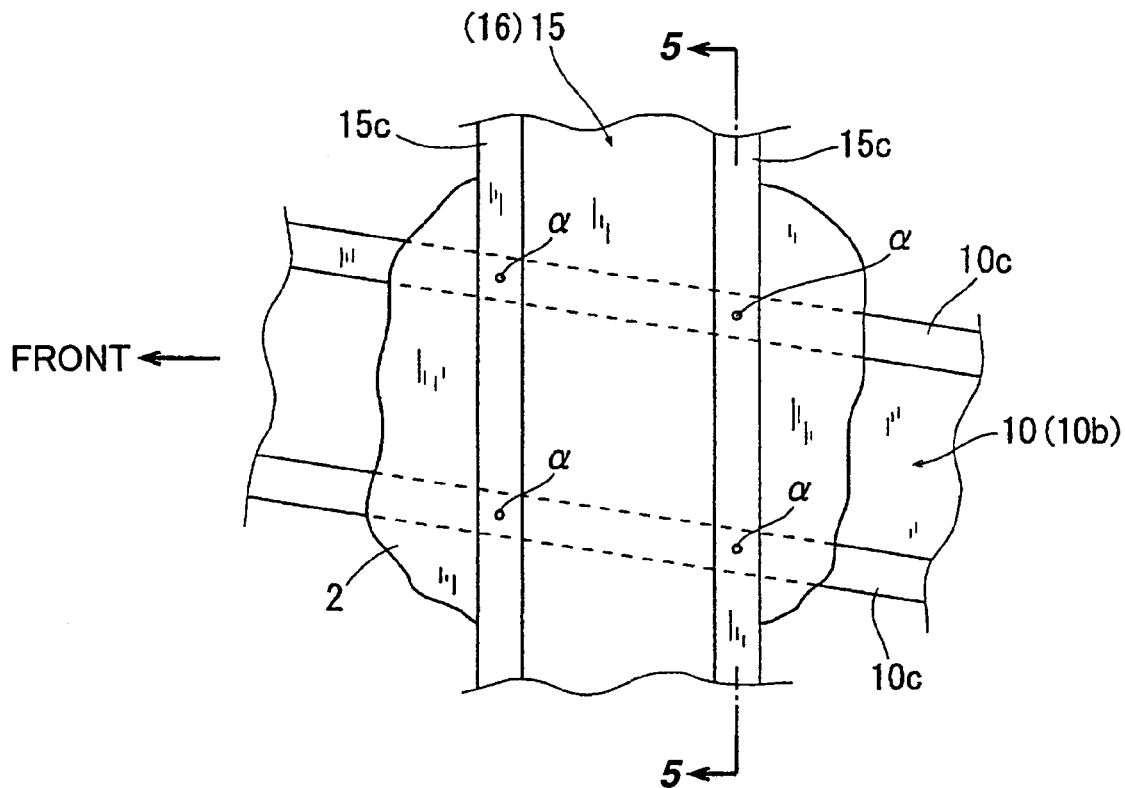
FIG. 6 is a fragmentary top view showing an intersecting area between the floor frame and the cross member.
Figure 7:
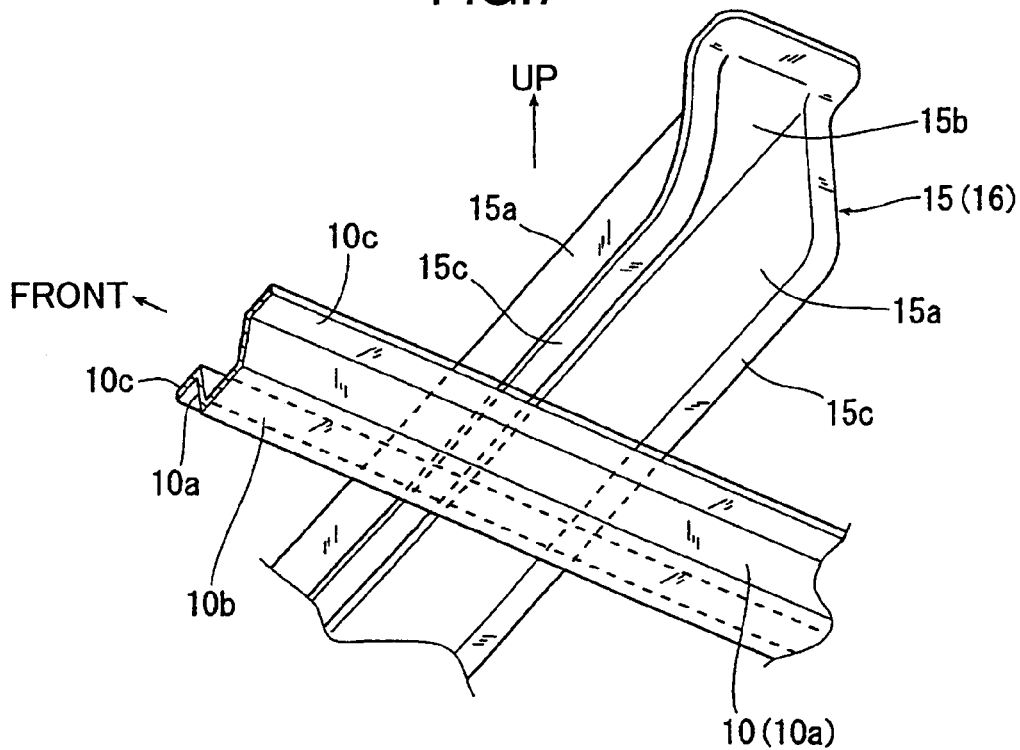
FIG. 7 is a fragmentary perspective bottom view showing the intersecting area between the floor frame and the cross member, wherein the front floor portion is omitted.

With reference to FIGS. 5 to 7, a relationship between respective joined regions of the cross members 15, 16 and the floor frames 10 relative to the front floor portion 2 will be described in detail. As shown in FIGS. 5 and 7, each of the floor frames 10 has a pair of laterally-spaced sidewalls 10a, a bottom wall 10b connecting respective lower ends of the sidewalls 10a to one another, and a pair of laterally-spaced flanges 10c each extending approximately horizontally from a corresponding one of upper ends of the sidewalls 10a. After the flanges 10c are seated on the bottom surface of the front floor portion 2, each of the floor frames 10 is joined (welded in this embodiment) to the front floor portion 2 (in FIG. 7, the front floor portion 2 is omitted).

Each of the cross members 15, 16 is joined to the front floor portion 2 and the floor frames 10 in the same manner. Thus, the following description will be made with a focus on the first cross member 15. The first cross member 15 has a pair of longitudinally-spaced sidewalls 15a, a top wall 15b connecting respective upper ends of the sidewalls 15a to one another, and a pair of longitudinally-spaced flanges 15c each extending approximately horizontally from a corresponding one of lower ends of the sidewalls 15a. After the flanges 15c are seated on the top surface of the front floor portion 2, the first cross member 15 is joined (welded in this embodiment) to the front floor portion 2 (in FIG. 7, the front floor portion 2 is omitted).

As seen in FIGS. 1, 6 and 7, the laterally-spaced flanges 10c of each of the floor frames 10 and the longitudinally-spaced flanges 15c of the cross member 15 (the same goes for the cross member 16) intersect with each other at total four positions in top plan view. The laterally-spaced flanges 10c and the longitudinally-spaced flanges 15c are joined to each other in these intersecting positions which are indicated by the reference mark "α" in FIGS. 5 and 6. As seen in FIG. 5, under the condition that the front floor portion 2 is sandwiched between one of the flanges 10c in each of the floor frames 10 and a corresponding one of the flanges 15c in the cross member 15 (16), the two flanges 10c, 15c and the front floor portion 2 are joined (welded in this embodiment) to each other in a three-layer structure.

Figure 8:
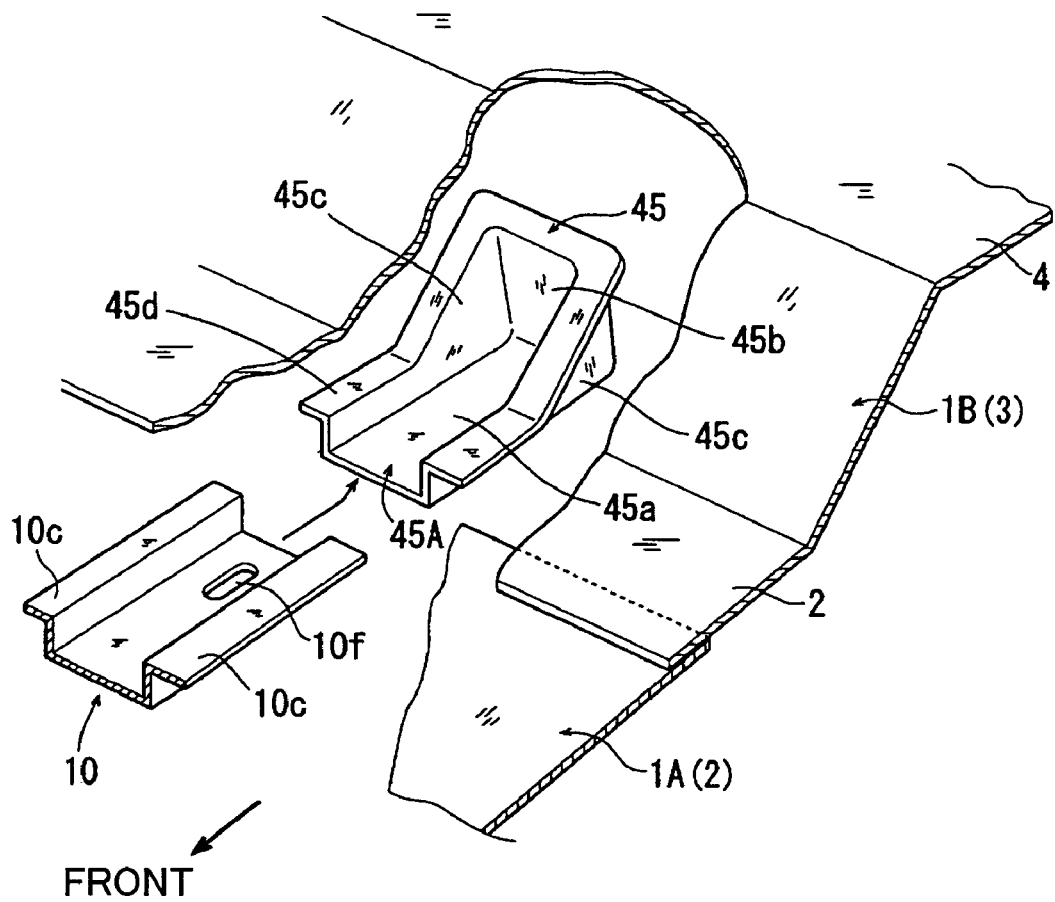
FIG. 8 is a fragmentary perspective view showing one example of an end gusset.

With reference to FIGS. 8 to 11, the pair of end gussets 45 and associated components will be described below (the end gussets 45 is also illustrated in FIGS. 1 and 2 in a simplistic manner). Each of the end gussets has a shape as shown in FIG. 8, which is obtained by subjecting a common or ordinary steel sheet, for example, to a press forming process. Specifically, the end gusset 45 has a front extension portion 45A with an approximately reverse-hat shape in section corresponding to the sectional shape of the floor frame 10. The end gusset 45 is formed in a box shape which has a bottom wall 45a (also serving as a bottom wall of the front extension portion 45A), a rear wall 45b extending upward from a rear end of the bottom wall 45a, and a pair of laterally-spaced sidewalls 45c continuous with opposite lateral ends of the bottom wall 45a and opposite lateral ends of the rear wall 45b. That is, the end gusset 45 has a closed shape, except for an opening to be opposed to the bottom surface of the front floor portion 2 and an opening to be opposed to a rear surface of the rear kick-up portion 3, in the state after it is attached to the automobile body (the downward side, the rearward side and both lateral sides are closed). Further, the end gusset 45 is formed with a joining flange 45d designed to be continuous with the flanges 10c of the floor frame 10.

As best shown in FIG. 8, each of the above end gussets 45 is joined to the bottom surface of the rear end region of the front floor portion 2 and the rear surface of the rear kick-up portion 3, by use of the flange 45d. In this joined state, each of the end gussets 45 defines a closed section in cooperation with the rear kick-up portion 3 and the rear end region of the front floor portion 2. Further, the respective rear end regions of the floor frames 10 are connected to the rear kick-up portion 3 through the corresponding end gussets 45. In this connected state, the respective rear end openings of the floor frames 10 are closed by the corresponding end gussets 45.

Figure 9:
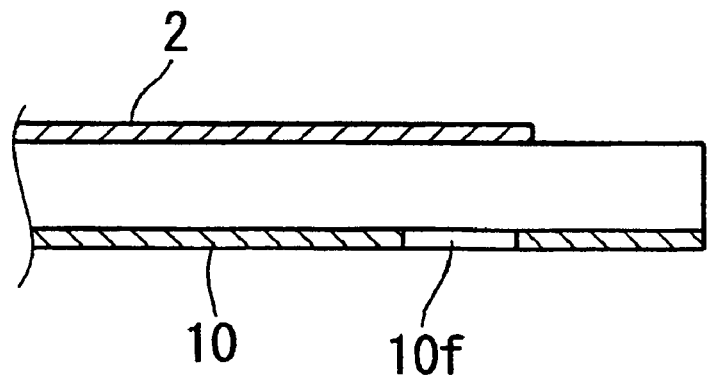
FIG. 9 is an explanatory sectional side view of a preferred example of an assembling process for the end gusset in FIG. 8 and associated body components.
Figure 10:
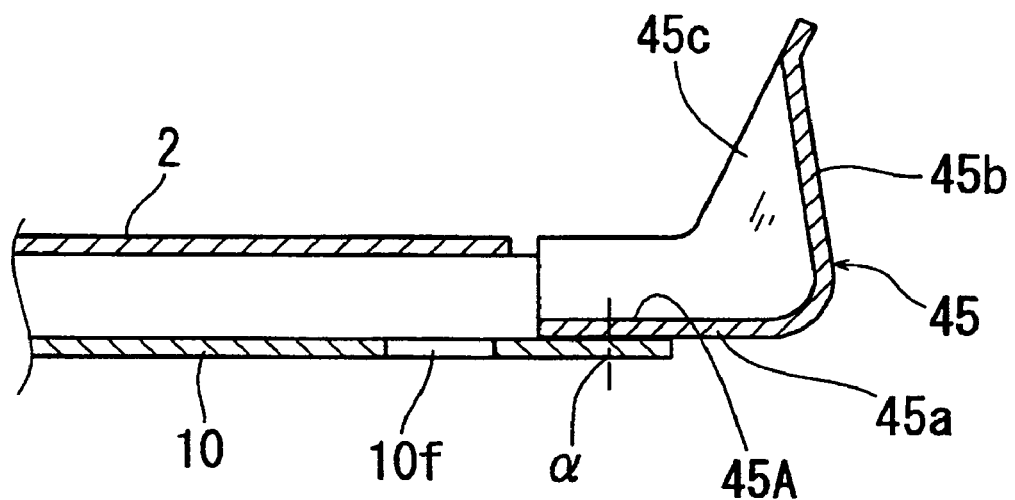
FIG. 10 is an explanatory sectional side view of a preferred example of an assembling process for the end gusset in FIG. 8 and associated body components.
Figure 11:
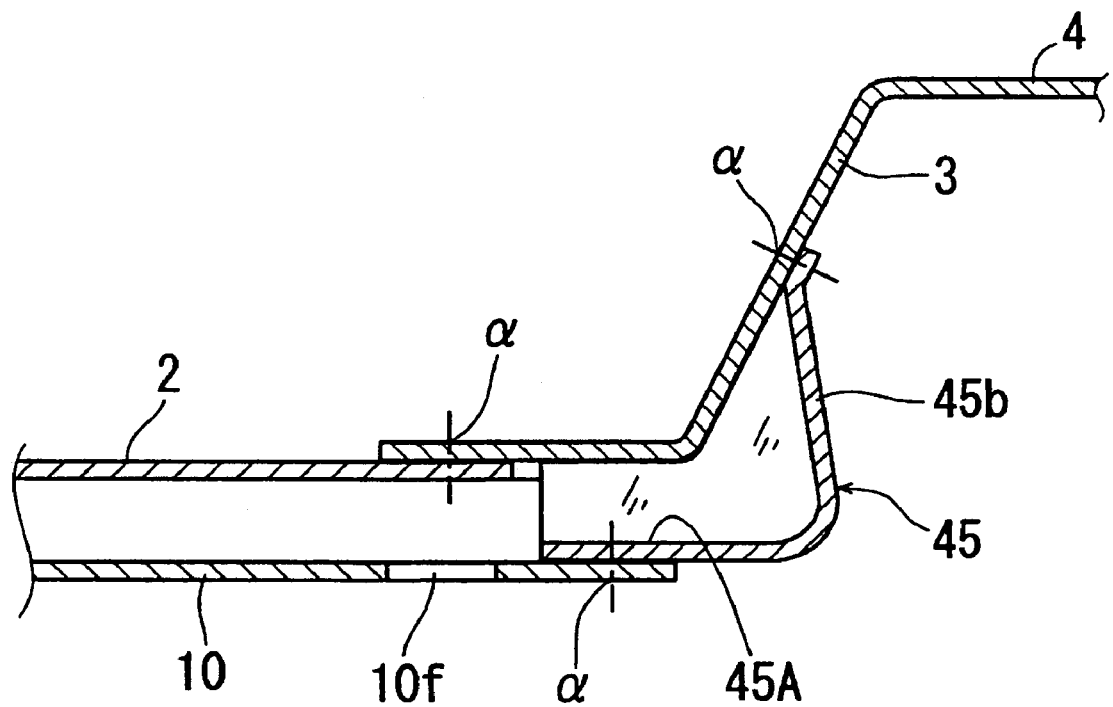
FIG. 11 is an explanatory sectional side view of a preferred example of an assembling process for the end gusset in FIG. 8 and associated body components.

FIGS. 9 to 11 show a preferred example of an assembling process for components including the end gusset 45 in the vicinity of the rear kick-up portion 3. In the first embodiment, the floor panel 1 fundamentally has a two-component structure consisting of a front panel 1A and a rear panel 1B which are divided along a boundary located slightly frontward relative to each rear end of the floor frames 10, and joined to one another through respective boundary regions thereof.

As shown in FIG. 9, (the flanges 10c of) the floor frame 10 is firstly joined to the bottom surface of the front panel 1A (joined position is indicated by the reference mark "α"), in such a manner as to allow the rear end of the floor frame 10 to protrude slightly rearward from the rear end of the front panel 1A. Then, as shown in FIG. 10, the front extension portion 45A of the end gusset 45 is joined to a top surface of a rear end region of the floor frame 10. Lastly, a front end region of the rear panel 1B is joined to a rear end region of the front panel 1A, and an upper end region of the end gusset 45 is joined to a rear surface (of the kick-up portion 3) of the rear panel 1B. The bottom surface of the rear end region of the floor frame 10 is formed with an assembling or operation hole 10f for allowing a welding gun to be inserted therethrough during an operation for joining the front and rear panels 1A and 1B together.

In the above structure, an impact load during a head-on collision is firstly entered into each of the front frames 11. Then, the impact load is transmitted from the front frame 11 to the corresponding floor frame 10, and simultaneously transmitted to the corresponding side-sill 7 through the torque box 12. Each of the floor frames 10 receiving the impact load will absorb the shock by itself and by the front floor portion 2 joined thereto. Simultaneously, in conjunction of a rearward displacement of the floor frames 10 caused by the received impact load, the impact load is transmitted from the floor frames 10 to the cross members 15, 16, and the cross members 15, 16 will also absorb the shock, as described in detail later. Each of the floor frames 10 is inclined or obliquely arranged. Thus, as compared with floor frames arranged without inclination (arranged parallel to the longitudinal axis of the automobile body), each of the floor frames 10 can have an increased entire length, so that the floor frames themselves and the front floor portion jointed to the floor frames 10 can more effectively perform a shock-absorbing function.

Each of the floor frames 10 is obliquely disposed relative to the cross members 15, 16. Thus, the impact load from the floor frames 10 to the cross members 15, 16 is transmitted in an oblique direction relative to the lateral axis of the automobile body. That is, in each of the cross members 15, 16, a region on the side of one of the side-sills 7 relative to the floor frame 10 adjacent thereto receives a compressive force, and a region on the side of the tunnel region 6 relative to the floor frame 10 receives a tensile force. The cross members 15, 16 have a large resistance against a compressive or tensile force, and thereby can more effectively receive a rearward impact load, as compared with conventional cross members simply designed to receive only a bending or shear force.

In the two longitudinally-spaced cross members 15, 16, a rearward impact load is transmitted from the floor frames 10 to the first cross member 15 located at the frontward position, at a larger value, as compared with the second cross member 16 located at the rearward position. That is, a rearward impact load to be transmitted to the second cross member 16 located on the rear side is reduced to a relatively small value, and thereby each rear end of the floor frames 10 originally has a small rearward displacement. In addition, the respective rear end of the floor frames 10 are connected to the rear kick-up portion 3 through the corresponding end gussets 45 so as to more reliably prevent or suppress the rearward movement of the rear ends of the floor frames 10. In other words, the above structure is desirable in preventing the occurrence of interference between each rear end of the floor flames 10 and a component, such as the fuel tank 8, disposed rearward relative to the rear kick-up portion 3. It is understood that the rigidity of a lower end region of the rear kick-up portion 3 is increased by the end gussets 45 themselves. This is also desirable in increasing the rigidity of the automobile body in the vicinity of a rear seat, because the rear kick-up portion 3 generally serves as a floor surface for the rear seat.

Figure 12:
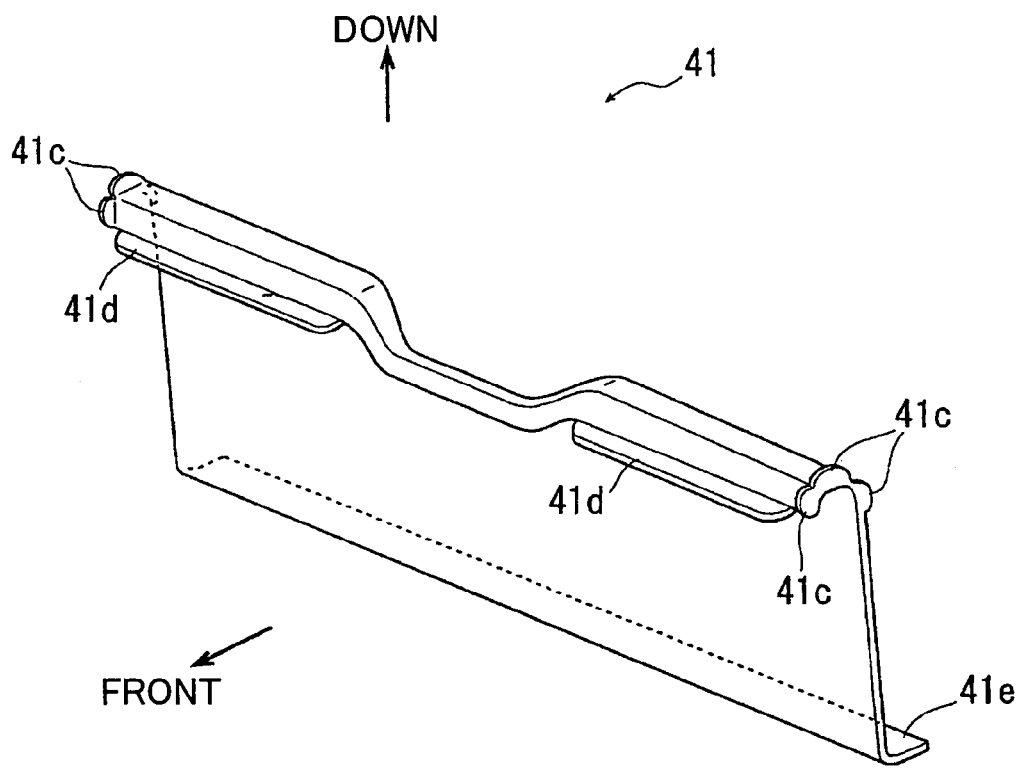
FIG. 12 is a perspective view showing one example of a fourth cross member or a rear cross member in an automobile underbody structure according to a second embodiment of the present invention.
Figure 13:
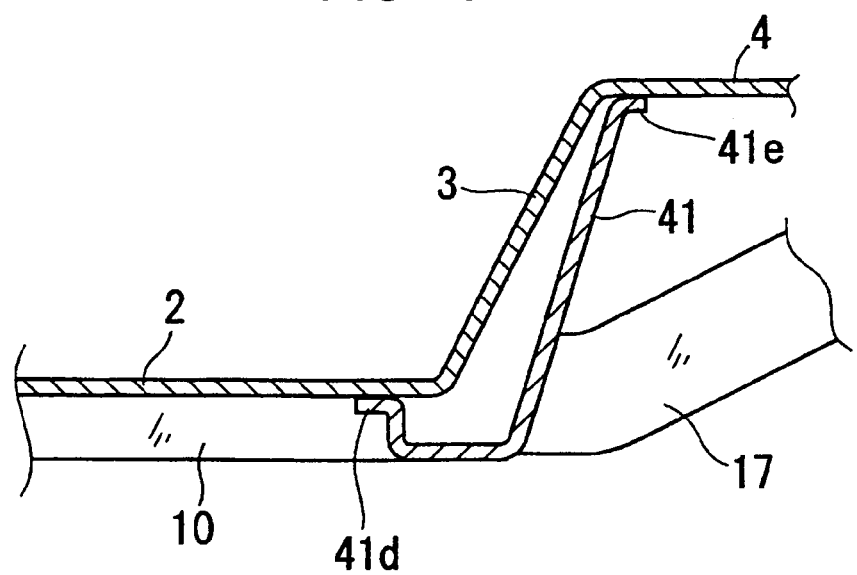
FIG. 13 is a sectional side view showing a relationship between the fourth cross member in FIG. 12 and a rear kick-up portion.
Figure 14:
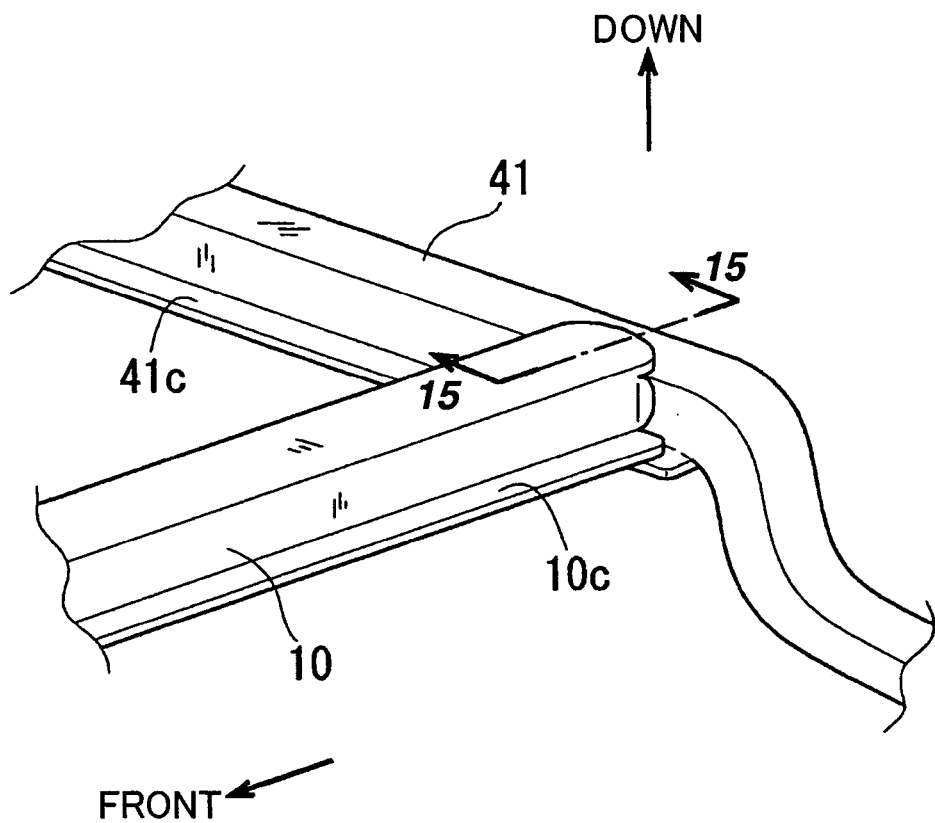
FIG. 14 is a perspective view showing a connection area between the fourth cross member in FIG. 12 and a rear end region of a floor frame.
Figure 15:
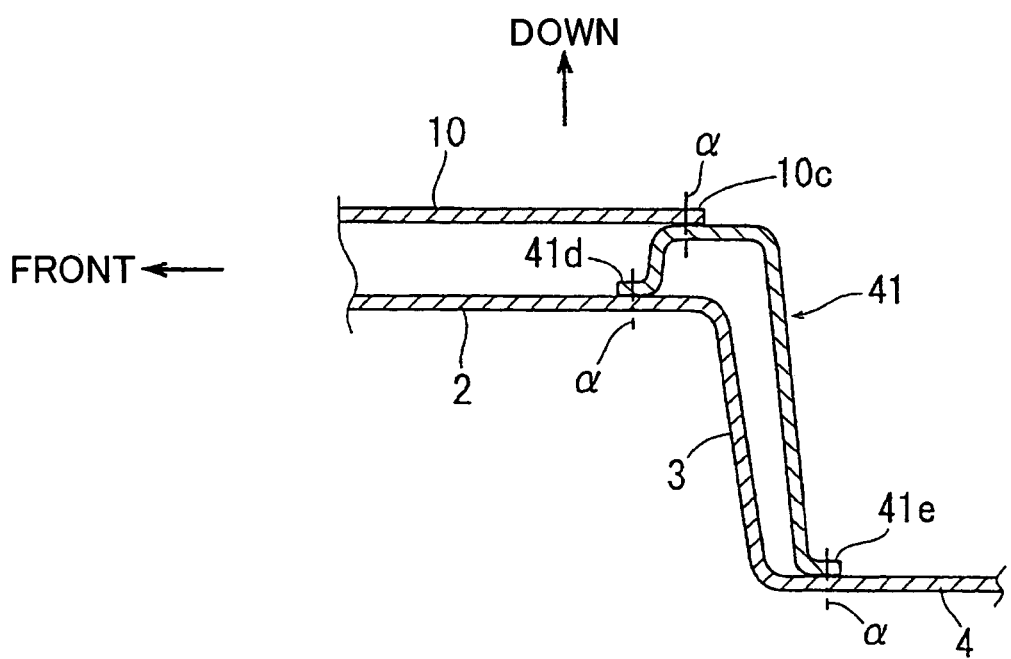
FIG. 15 is a sectional view taken along the line 15—15 in FIG. 14.

FIGS. 12 to 15 show an automobile underbody structure according to a second embodiment of the present invention. In these figures, the same element or component as that in the first embodiment is defined by the same reference numeral or mark, and its duplicated description will be omitted (the after-mentioned other embodiments will be also described in the same manner). The underbody structure according to the second embodiment is provided with a fourth cross member 41, and designed to allow this fourth cross member 41 to act as an end gusset. Specifically, respective front end regions of a pair of laterally-spaced rear frames 17 are connected to one another by the fourth cross member 41 extending laterally as shown in FIG. 12. Further, respective rear end regions of a pair of laterally-spaced floor frames 10 are connected to the fourth cross member 41.

The fourth cross member 41 generally has a shape as shown in FIG. 12. Specifically, the fourth cross member 41 is joined to the rear frames 17 by use of a pair of flanges 41c formed, respectively, at opposite lateral ends thereof, and joined to a bottom surface of a rear end region of a front floor portion 2 by use of a flange 41d formed at a lower end thereof. Further, the fourth cross member 41 is joined to a bottom surface of a front end region of a rear floor portion 4 by use of a flange 41e formed at an upper end thereof. This fourth cross member 41 defines a closed section in cooperation with the rear end region of the front floor portion 2, a rear kick-up portion 3 and the front end region of the rear floor portion 4.

Figure 16:
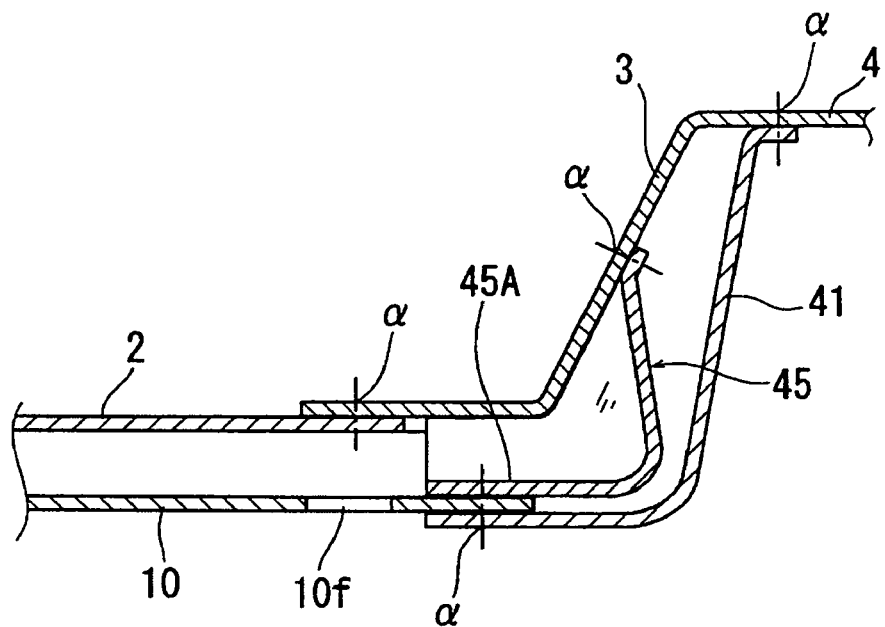
FIG. 16 is a fragmentary sectional side view showing an automobile underbody structure according to a third embodiment of the present invention.
Figure 17:
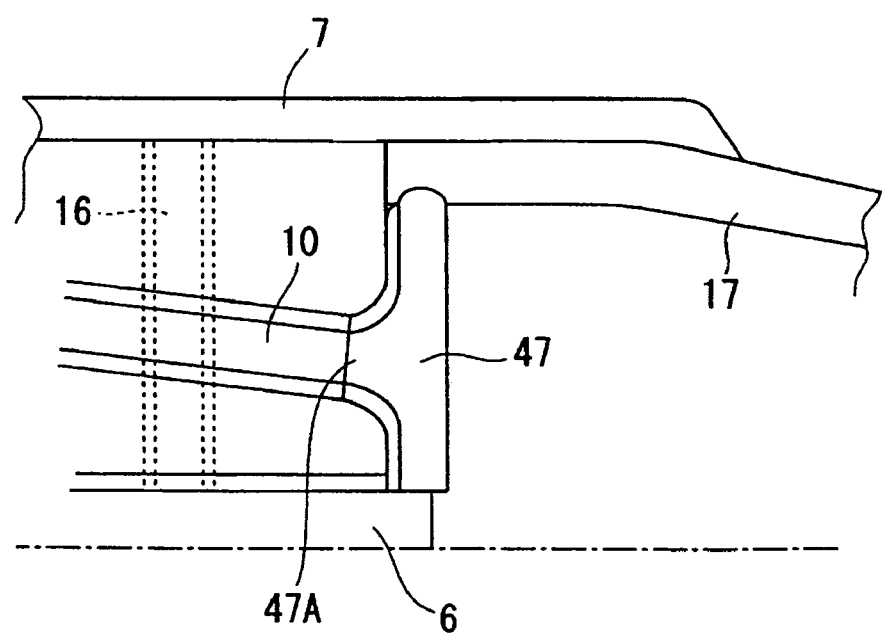
FIG. 17 is a fragmentary bottom view showing a rear kick-up portion and the vicinity thereof in an automobile underbody structure according to a fourth embodiment of the present invention.

Respective rear-end openings of the floor frames 10 is covered by a front surface of the fourth cross member 41. The fourth cross member 41 serves as a means to largely increase the rigidity of an automobile body, and additionally acts as the pair of end gussets 45 in the first embodiment. This is also desirable in minimizing the number of components. The fourth cross member 41 may be formed with the respective front extension portions 45A of the end gussets 45 in the first embodiment (that is, a pair of laterally-spaced front extension portions will be formed therein) FIG. 16 shows an automobile underbody structure according to a third embodiment of the present invention, wherein the pair of the end gussets 45 illustrated in FIG. 8 and the fourth cross member 41 illustrated in FIG. 12 are incorporated therein. FIG. 16 is a sectional view corresponding to FIG. 11 or 13. This automobile underbody structure provided with the end gussets 45 and the fourth cross member 41 is desirable in more reliably preventing or suppressing a rearward movement of each rear end of a pair of laterally spaced floor frames 10, and further increasing the rigidity of an automobile body.

Figure 18:
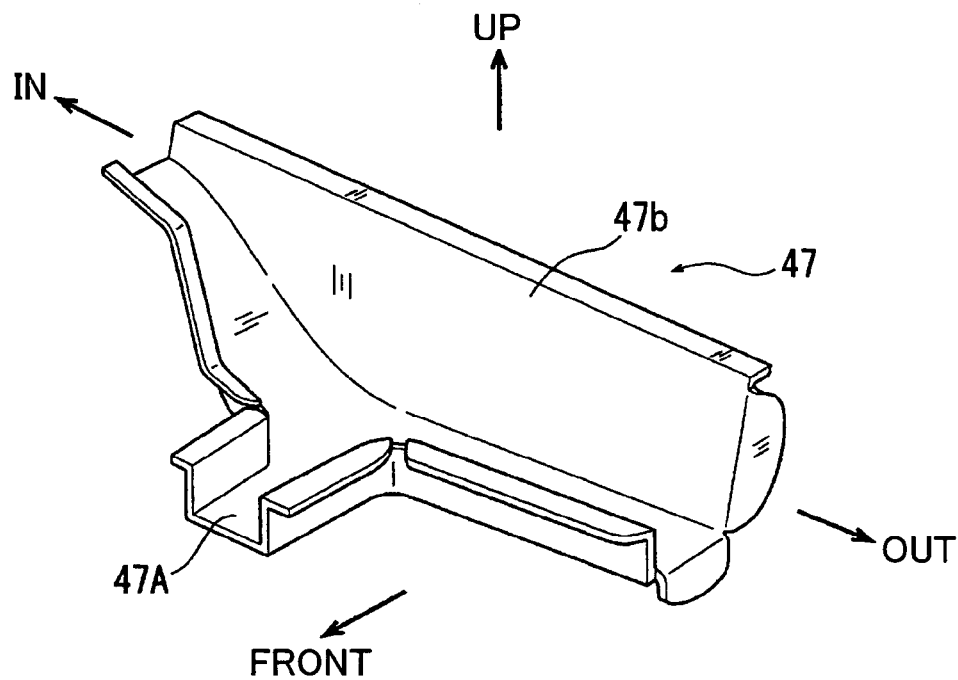
FIG. 18 is a perspective view showing an end gusset in FIG. 17.
Figure 19:
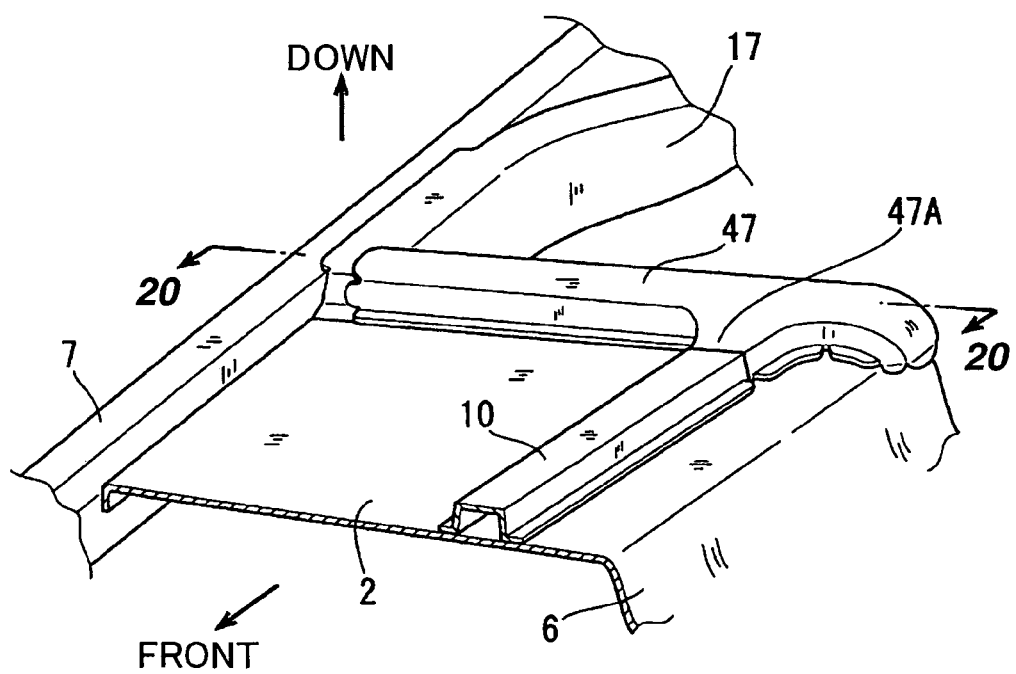
FIG. 19 is a perspective view showing an area corresponding to FIG. 17.
Figure 20:
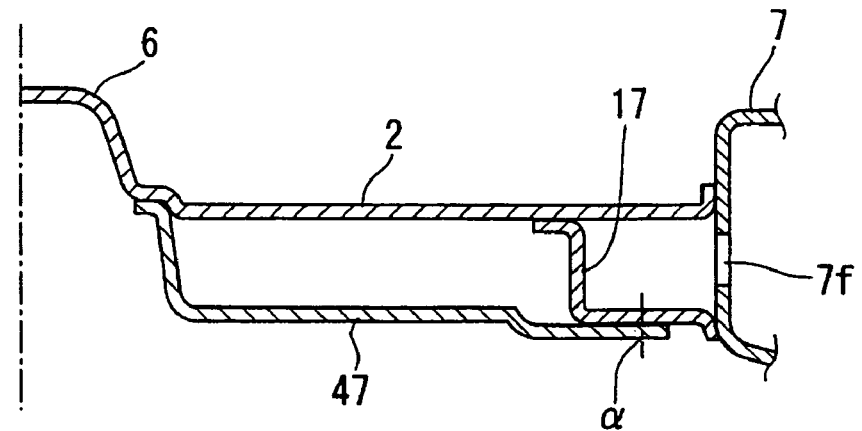
FIG. 20 is a sectional view taken along the line 20—20 in FIG. 19.

FIGS. 17 to 20 show an automobile underbody structure according to a fourth embodiment of the present invention. The automobile underbody structure according to the fourth embodiment employs a pair of end gussets 47 each having a shape as shown in FIG. 18. Specifically, each of the end gusset 47 is formed with a front extension portion 47A having the same sectional shape as that of each of a pair of laterally-spaced floor frames 10. Further, the end gusset 47 has a lateral length greater than that of the end gusset 45 illustrated in FIG. 8. That is, the end gusset 47 has a laterally-outer end region joined to a front end region of a corresponding one of a pair of laterally-spaced rear frames 17, and a laterally-inner end region joined to a tunnel region 6 (specifically, a base of the tunnel region 6 where it starts protruding upward). In this case, (an inner panel of) each of a pair of laterally spaced side-sills 7 is formed with an assembling or operation hole 7f (see FIG. 20) for welding/joining between one of the rear frames 17 and the corresponding end gusset 47.

In each of the end gussets 47, a bottom wall of the front extension portion 47A has a continuously extending bottom surface designed to be flush with a bottom surface of a corresponding one of the front frames 10. Further, the end gusset 47 includes a rear wall portion 47B extending upward by a relatively long distance and having a top (upper) end joined to a rear surface of a rear kick-up portion 3, so as to define a closed section in cooperation with the rear kick-up portion 3.

Figure 21:
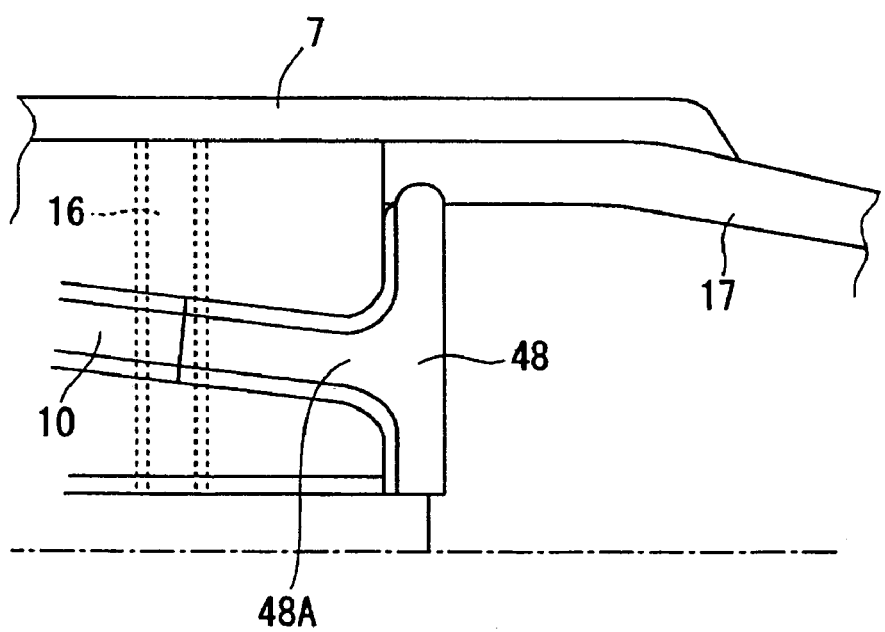
FIG. 21 is a fragmentary bottom side view showing an area corresponding to FIG. 17, in an automobile underbody structure according to a fifth embodiment of the present invention.

FIG. 21 shows an automobile underbody structure according to a fifth embodiment of the present invention, which relates to one modification of the end gusset 47 illustrated in FIGS. 17 to 20. Each of a pair of end gussets 48 in the fifth embodiment fundamentally has the same structure as that of the end gusset 47 in the fourth embodiment, except that each of the end gussets 48 has a front extension portion 48A (corresponding to the front extension portion 47A) designed to have a longer length or designed such that a front end thereof extends up to a position close to a second cross member 16. That is, each of the front extension portions 48A serves as a rear end region of a corresponding one of a pair of laterally-spaced floor frames 10 which extends up to the vicinity of a rear kick-up portion 3. Further, a frontward portion of each of the floor frames 10 (a portion of the floor frame 10 extending from its front end to the second cross member 16) is formed of a high-tensile steel sheet, and each of the end gussets 48 is formed of a common or ordinary steel sheet. In the fifth embodiment, when both a high-tensile steel sheet and an ordinary steel sheet are used for the floor frame 10 according to need, a rearward portion of the floor frame 10 to be formed of the ordinary steel sheet can be substituted with a part (front extension portion 48A) of the end gusset 48 without additionally preparing an independent member dedicated to the rearward portion.

Figure 22:
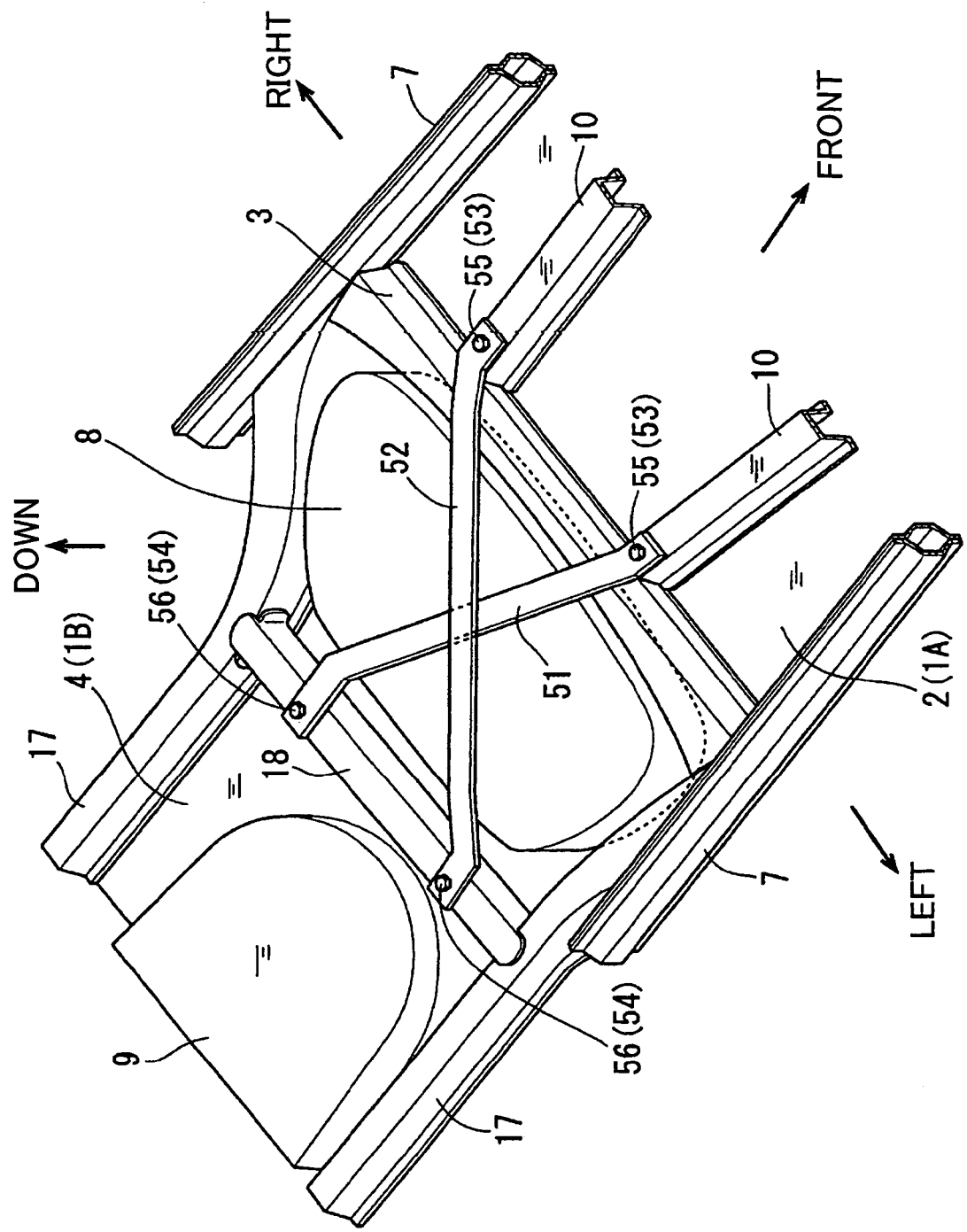
FIG. 22 is a fragmentary perspective view showing a mounting structure for a support band supporting a fuel tank.
Figure 23:
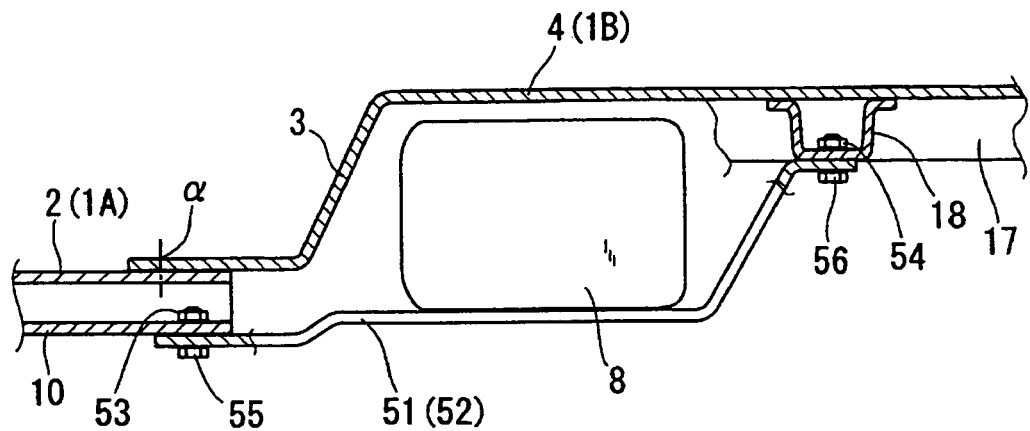
FIG. 23 is a fragmentary sectional side view showing a fuel tank supported by the support band.
Figure 24:
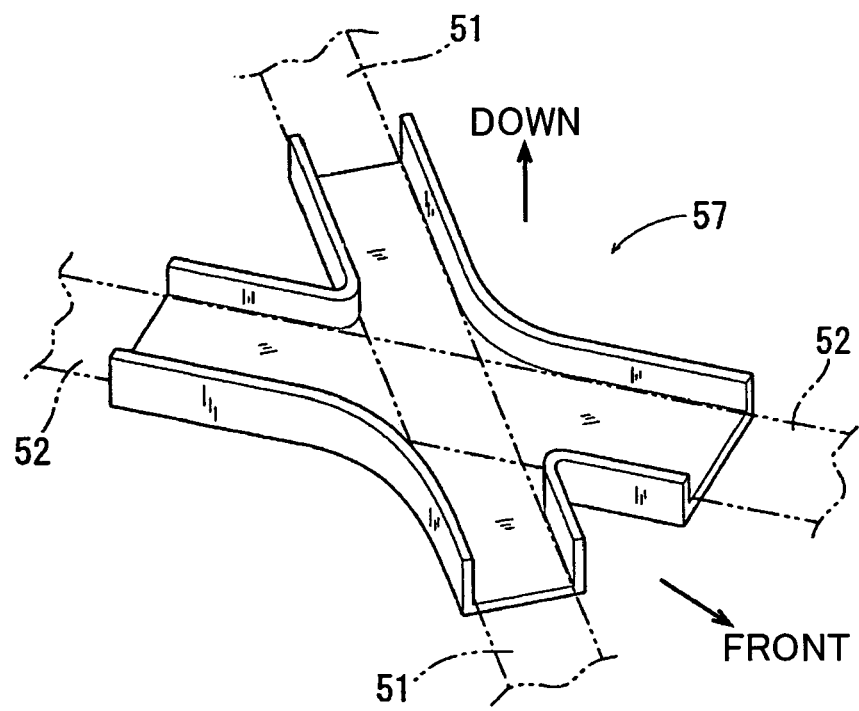
FIG. 24 is a perspective view showing a bracket suitable for use in a crossing area of two support bands.

While the present invention has been described with reference to the above specific embodiments, it is not intended to be limited to the invention in these embodiments. It is obvious to those skilled in the art that various changes and modifications may be made therein without departing from the spirit and scope thereof as set forth in appended claims. For example, it is intended that the following modifications may be encompassed within the scope of the present invention. The floor flame 10 may be made of the same material over the entire length thereof (e.g. made of high-tensile steel over the entire length). The number of cross members intersecting with the floor frames 10 in top plan view is not limited to two sets, but may be one set or three sets or more. The cross member 15, 16 may be joined to the bottom surface of the front floor portion 2. The pair of laterally-spaced floor frames 10 may be disposed parallel to one another (parallel to the longitudinal axis of the automobile body). Each of the end gussets 45 may be used as a mounting portion to which (a front end region of) a support band for supporting the fuel tank 8 from under a bottom thereof is mounted. In this case, a fastener, such as a nut, for fastening the support band, may be integrated with the end gusset 45 by welding or the like. In particular, when the pair of laterally-spaced floor frames 10 is designed to be inclined laterally inward toward the rear ends thereof, each lateral position of the end gussets 45 will be located at a position fairly close to the tunnel region 6, or a desirable position for fastening the front end region of the support band. It is to be understood that the object of the present invention is not limited to one explicitly described herein, but it is intended that any objectives substantially expressed as desirable or advantageous aspects are implicitly included therein. With reference to FIGS. 22 to 24, a mounting structure for a support band supporting a fuel tank 8 from underneath will be described below. The following description will be made on the assumption that a floor panel 1 has a two-component structure consisting of a front panel 1A and a rear panel 1B which are divided along a boundary located slightly frontward relative to each rear end of a pair of laterally-spaced floor frames 10, and joined to one another through respective boundary regions thereof.

The support band comprises a first support band 51 and a second support band 52. Two nuts 53 each serving as a front band-mounting portion are pre-joined, respectively, to rear end regions (bottom walls) of the floor frames 10 (formation of a pair of laterally-spaced, or right and left, front band-mounting portions). Further, a pair of laterally-spaced, or right and left, nuts 54 each serving as a rear band-mounting portion are pre-joined to a bottom wall of a third cross member (connection cross member) 10 located rearward relative to the fuel tank 8. Each lateral position of the rear nuts 54 is arranged to be located on an approximately rearward extension line of each of the front nuts 53. In a commonly used manner, the floor frames 10 and the third cross member 3 are formed with bolt insertion holes corresponding to the nuts 53, 54.

An operation for mounting the front end regions of the support bands 51, 52, respectively, to the floor frames 10 is performed using a bolt 55 to be threadingly engaged with each of the nuts 53 from underneath. An operation for mounting the rear end regions of the support bands 51, 52 to the third cross member 18 is performed using a bolt 56 to be threadingly engaged with each of the nuts 54 from underneath. In one example of the mounting structure, the two support bands 51, 52 are mounted in a crossed arrangement. More specifically, the front end region and rear end region of the first support band 51 are fastened, respectively, to the left nut 53 and the right nut 54. Further, the front end region and rear end region of the second support band 51 are fastened, respectively, to the right nut 53 and the left nut 54. Thus, the two support bands 51, 52 are crossed to one another below the fuel tank 8. In this example, each of the right and left nuts 53 located at the frontward position, or each rear end of the floor frames 10, is designed to be located at a laterally inward position to a much greater degree as compared with a case where the floor frames 10 are disposed parallel to the longitudinal axis of the automobile body without inclination, or at a position significantly desirable in supporting the fuel tank 8 in a balanced manner. This arrangement is particularly advantageous to a fuel tank 8 having a relatively small lateral length.

Preferably, a bracket 57 as shown in FIG. 24 is disposed at the crossing area of the two support bands 51, 52. The bracket 57 is generally formed in an approximately X shape. Further, a side wall of the bracket 57 is designed to have a height equal to or greater than a total thickness of the two support bands 51, 52 superimposed on one another. This bracket 57 allows the two support bands 51, 52 to be reliably maintained in a crossed position at a given angle. Preferably, the bracket 57 is fixed onto a bottom surface of the fuel tank 8 by means of adhesive or the like or fixed to at least one of the support bands 51, 52 by means of adhesive or the like.

Figure 25:
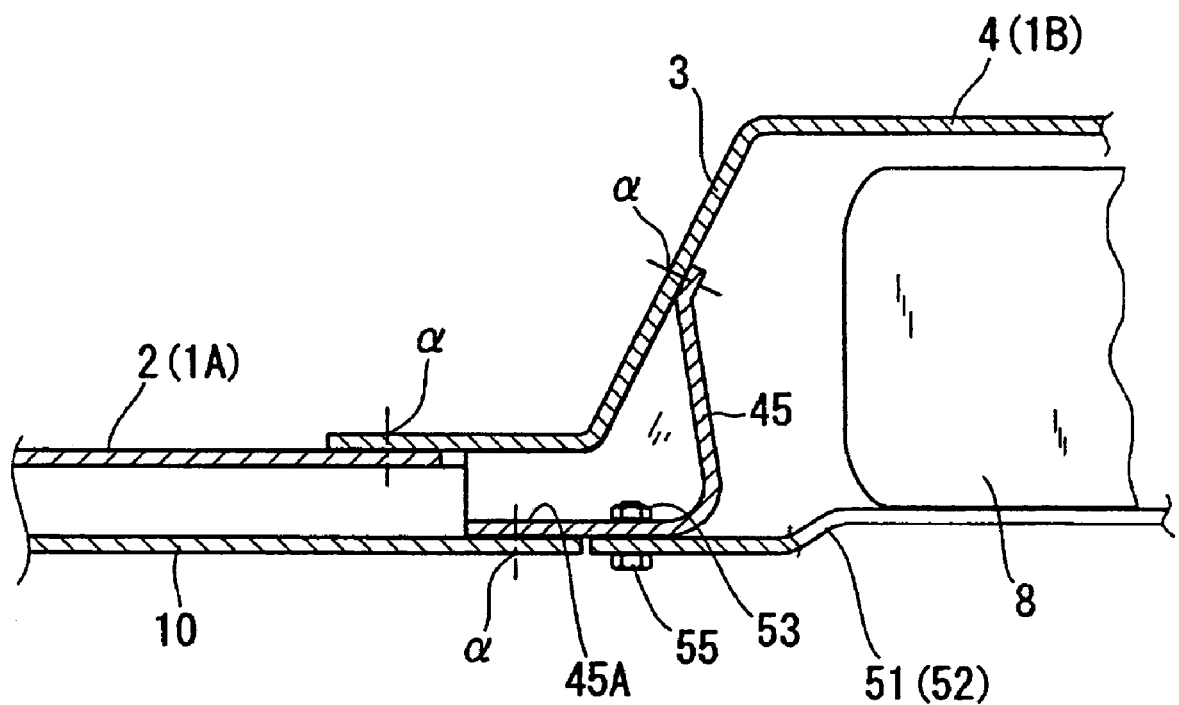
FIG. 25 a fragmentary sectional side view showing an area having the end gusset in FIG. 8.

FIG. 25 shows another example of the mounting structure for the support bands 51, 52, wherein respective rear end regions of the floor frames 10 are connected to the rear kick-up portion 3 by use of the aforementioned end gussets 45 (see FIG. 8), and the front band-mounting portion for the support band is formed in each of the end gussets 45. Each of the end gussets 45 is formed in a shape as shown in FIG. 11, by subjecting an ordinary steel sheet, for example, to a press forming process. As mentioned above, the end gusset 45 includes a front extension portion 45A having an approximately reverse-hat shape in section corresponding to a sectional shape of the floor frame 10. The end gusset 45 is formed in a box shape which has a bottom wall 45a (also serving as a bottom wall of the front extension portion 45A), a rear wall 45b extending upward from a rear end of the bottom wall 45a, and a pair of laterally-spaced sidewalls 45c continuous with opposite lateral ends of the bottom wall 45a and opposite lateral ends of the rear wall 45b. That is, the end gusset 45 has a closed shape, except for an opening to be opposed to the bottom surface of the front floor portion 2 and an opening to be opposed to a rear surface of the rear kick-up portion 3, in the state after it is attached to the automobile body (the downward side, the rearward side and both lateral sides are closed). Further, the end gusset 45 is formed with a joining flange 45*d* designed to be continuous with the flanges 10*c* of the floor frame 10.

As shown in FIG. 25, each of the above end gussets 45 is joined to the bottom surface of the rear end region of the front floor portion 2 and the rear surface of the rear kick-up portion 3, by use of the flange 45*d* thereof. In this joined state, each of the end gussets 45 defines a closed section in cooperation with the rear kick-up portion 3 and the rear end region of the front floor portion 2. Further, the respective rear end regions of the floor flames 10 are connected to the rear kick-up portion 3 through the corresponding end gussets 45. In this connected state, the respective rear end openings of the floor frames 10 are closed by the corresponding end gussets 45. The nut 53 illustrated in FIG. 25 is omitted in FIG. 8.

Figure 26:
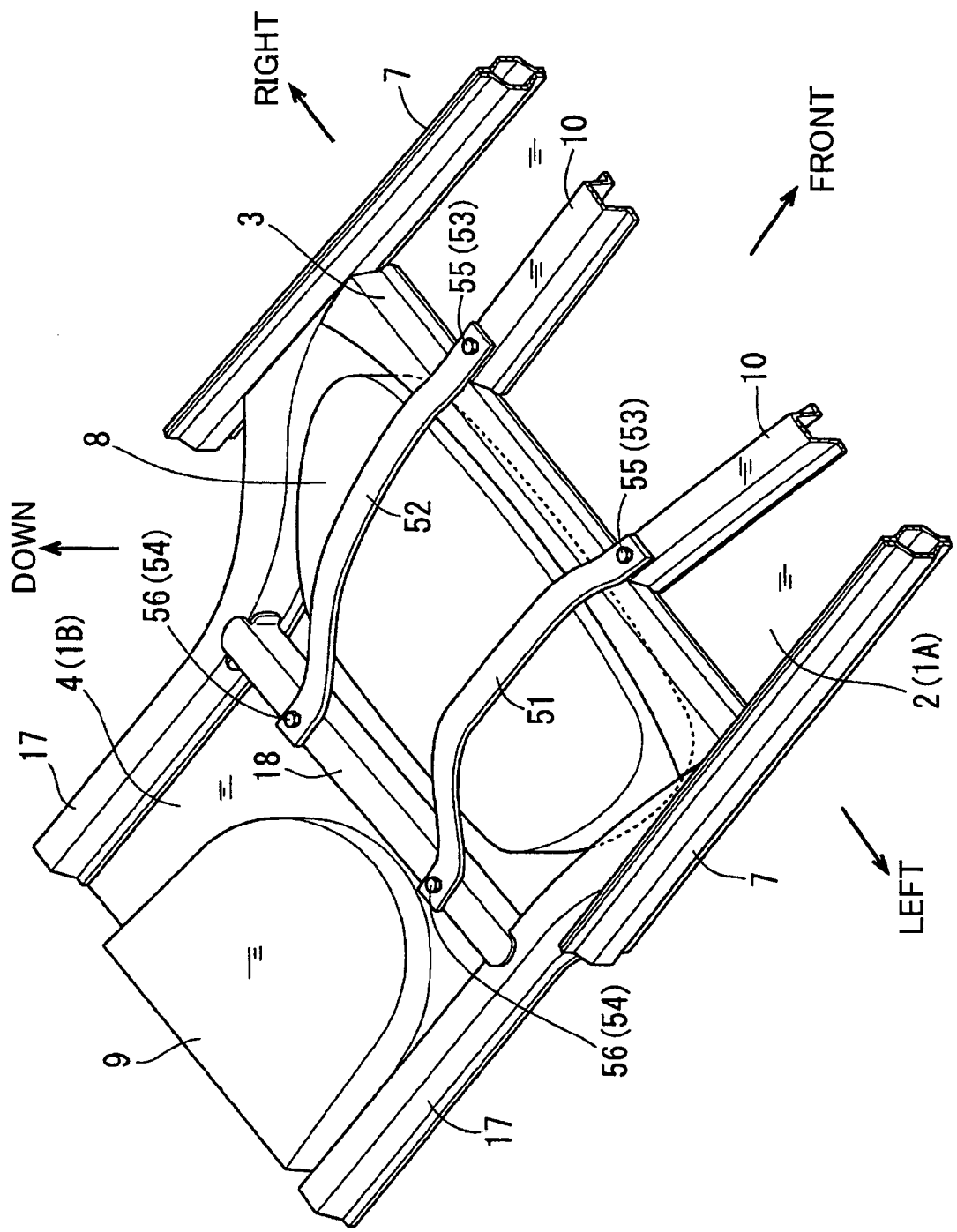
FIG. 26 is a perspective bottom view showing another example of the mounting structure for the support band in an area corresponding to FIG. 22.

FIG. 26 shows yet another example of the mounting structure for the support bands 51, 52. This example is designed to arrange the two support bands 51, 52 parallel to one another, or allow the two support bands 51, 52 to be disposed in a so-called "parallel arrangement". Specifically, the front end region and rear end region of the first support band 51 are fixed by use, respectively, of the left nuts 53, 54, and the front end region and rear end region of the second support band 52 are fixed by use, respectively, of the right nuts 53, 54, While the present invention has been described with reference to the above specific embodiments, it is not intended to be limited to the invention in these embodiments. It is obvious to those skilled in the art that various changes and modifications may be made therein without departing from the spirit and scope thereof as set forth in appended claims. For example, it is intended that the following modifications may be encompassed within the scope of the present invention. The number of cross members intersecting with the floor frames 10 in top plan view is not limited to two sets, but may be one set or three sets or more. The cross member 15, 16 may be joined to the bottom surface of the front floor portion 2. The pair of laterally-spaced floor frames 10 may be disposed parallel to one another (parallel to the longitudinal axis of the automobile body). Instead of the nuts 53, 54, the band-mounting portion may be appropriately designed in any other suitable configuration, for example an internally-threaded bolt hole formed directly in each rear end region of the floor frames 10, depending on types of fixing means. The bottom surface of the fuel tank 8 may be formed with a shallow groove for allowing the support bands 51, 52 to be fitted therein. It is to be understood that the object of the present invention is not limited to one explicitly described herein, but it is intended that any objectives substantially expressed as desirable or advantageous aspects are implicitly included therein.

In summary, as described in claim 1 in the appended claims, the present invention in one aspect (aspect 1) provides an underbody structure for an automobile, comprising: a floor panel which includes a front floor portion connecting a pair of laterally-spaced side-sills to one another and having a tunnel region extending longitudinally along the lateral center thereof, a rear kick-up portion extending upward from a rear end of the front floor portion, and a rear floor portion extending from an upper end of the rear kick-up portion rearward and approximately linearly; a pair of laterally-spaced floor frames disposed to extend longitudinally in such a manner as to interpose the tunnel region therebetween, and joined to a bottom surface of the front floor portion, wherein each of the floor frames has an approximately reverse-hat shape in section, and a rear end extending up to the vicinity of the rear kick-up portion; a pair of laterally-spaced front frames each having a rear end joined to a front end of a corresponding one of the floor frames; and an end gusset connecting each rear end region of the floor frames and the rear kick-up portion from the exterior side of the automobile.

According to the above solution, each rear end region of the floor frames can be connected to the rear kick-up portion through the end gusset to prevent or suppress a rearward movement of each rear end of the floor frames during a head-on collision. In addition, the end gusset makes it possible to provide enhanced rigidity in a region of the automobile body ranging from each rear end region of the floor frames to the rear kick-up portion.

Preferred embodiments based on the above solution are as described in claims 2 to 14 in the appended claims.

Specifically, the end gusset may be designed to close up each rear end opening of the floor frames (corresponding to aspect 2). In this case, the rear ends of the floor frames which have heretofore been in the as-cut state are closed by the end gusset. This can prevent or reduce damages of various devices or components located rearward relative to the rear kick-up portion, which would otherwise be caused by interference with the rear ends of the floor frames.

The end gusset may be designed to define a closed section in cooperation with the rear kick-up portion (corresponding to aspect iii). This is advantageous in more reliably obtaining the effect corresponding to the aspect 1.

The end gusset may have a front extension portion which protrudes frontward and has an approximately reverse-hat shape in section. This front extension portion may be joined to each rear end region of the floor frames (corresponding to the aspect iv). In this case, the front extension portion of the end gusset may have the same sectional shape as that of the floor frames. This is advantageous in readily connecting the end gusset and each rear end of the floor frame with high reliability.

When the underbody structure includes one or more cross members disposed to extend laterally so as to connect each of the side-sills and the tunnel region, and jointed to the front floor portion, the front extension portion of the end gusset may extend up to a specific one of the cross members located closest to the rear kick-up portion, whereby the front extension portion serves as a portion of each of the floor frames located rearward relative to the specific cross member (corresponding to aspect 5). In this case, each rearward portion or rear end region of the floor frames is substantially composed of the front extension portion of the end gusset. This is advantageous in minimizing a length of the floor frame which is essentially a relatively long member to be joined to the front floor portion, so as to facilitate the handling and joining operation of the floor frame. In addition, while the connection area between the end gusset and each rear end region of the floor frames is apt to have a complicated structure, such a connection area can be incorporated in the end gusset in advance. This is advantageous in reinforcing the connection area between the end gusset and each rear end region of the floor frames, and/or forming this connection area in a desired configuration.

A portion of each of the floor frames extending from its front end to a position joined to the front extension portion of the end gusset may be formed of a high-tensile steel sheet, and the end gusset including the front extension portion may be formed of an ordinary steel sheet (corresponding to aspect 6). In this case, a frontward portion of the floor frame required to transmit a large impact load during a head-on collision is formed of a high-tensile steel sheet, and a rearward portion of the floor frame is formed of an ordinary steel sheet. This is advantageous in facilitating reduction in cost while preventing the occurrence of buckling in the frontward portion.

When the underbody structure includes a rear frame joined to a bottom surface of the rear floor portion, the end gusset may have a laterally-outer end region connected to a front end region of the rear frame, and a laterally-inner end region extending up to a base of the tunnel region (corresponding to aspect 7). This is advantageous in increasing a lateral strength of the automobile body, and particularly in preventing a lateral expansion of the tunnel region.

When the underbody structure includes a pair of laterally-spaced rear frames each joined to a bottom surface of the rear floor portion, and a rear cross member connecting the rear frames to one another, the rear cross member may be joined to each rear end region of the floor frames, whereby the rear cross member serves as the end gusset (corresponding to aspect 8). In this case, the rear cross member makes it possible to drastically increase the strength (rigidity) of the automobile body. Further, this rear cross member can also be used as the end gusset.

The rear cross member may define a closed section in cooperation with a front end region of the rear floor portion, the rear kick-up portion and a rear end region of the front floor portion (corresponding to aspect ix). This is advantageous in more reliably obtaining the effect corresponding to aspect 8.

When the automobile is equipped with a fuel tank disposed rearward relative to the rear kick-up portion and under the rear floor portion, and the underbody structure includes a support band mounted thereto at both frontward and rearward positions relative to the fuel tank to extend longitudinally so as to support the fuel tank from under the fuel tank, the end gusset may be provided with a front band-mounting portion to which a front end region of the support band is mounted (corresponding to aspect 10). In this case, the end gusset acting as the rearward extension member of the floor frames provided as a strength member for the automobile body also serves as a bracket to be formed with the front band-mounting portion. This makes it possible to eliminate the need for an additional bracket dedicated to forming the front band-mounting portion. In particular, while a large rearward tensile force acts on the front band-mounting portion due to a weight of the fuel tank imposed thereon, the floor frames have a significantly high strength against a longitudinal tensile force, so that the front band-mounting portion can reliably withstand the large rearward tensile force to be received from the support band.

The end gusset in this underbody structure can increase the rigidity of the automobile body in the vicinity of the rear kick-up portion.

When the underbody structure includes a pair of laterally-spaced rear frames each disposed to extend longitudinally and joined to a bottom surface of the rear floor portion at a position located laterally outward relative to the fuel tank, and a connection cross member is disposed rearward relative to the fuel tank to connect the rear frames to each other, the connection cross member may be provided with a rear band-mounting portion to which a rear end region of the support band is mounted (corresponding to aspect 11). In this case, the rear band-mounting portion can be formed by use of the connection cross member provided as a strength member When the underbody structure has the end gusset provided with two of the front band-mounting portions at laterally spaced positions corresponding, respectively, to the floor frames, the connection cross member provided with two of the rear band-mounting portions at laterally spaced positions, and the support band including first and second support bands corresponding, respectively, to the two pairs of front and rear band-mounting portions, the first support band may be mounted between one of the front band-mounting portions and one of the rear band-mounting portions located on the laterally opposite side thereof, and the second support band may be mounted between the other front band-mounting portion and the other rear band-mounting portion, so that the first and second support bands are crossed to one another below the fuel tank (corresponding to aspect 12). In this case, the fuel tank is supported by the two support band in a crossed arrangement. This is advantageous in stably supporting the fuel tank with high reliability.

When the underbody structure has the end gusset provided with two of the front band-mounting portions at laterally spaced positions corresponding, respectively, to the floor frames, the connection cross member provided with two of the rear band-mounting portions at laterally spaced positions, and the support band including first and second support bands corresponding, respectively, to the two pairs of front and rear band-mounting portions, the first support band may be mounted between one of the front band-mounting portions and one of the rear band-mounting portions located on laterally the same side as that thereof, and the second support band may be mounted between the other front band-mounting portion and the other rear band-mounting portion, so that the first and second support bands are disposed laterally spaced apart from and parallel to one another (corresponding to aspect 13). In this case, the fuel tank is supported by the two support band in a parallel arrangement. This is advantageous in stably supporting the fuel tank with high reliability.

When the underbody structure includes a front cross member disposed to extend laterally so as to connect each of the side-sills and the tunnel region, and joined to a top surface of the front floor portion, each of the floor frames may be inclined laterally inward toward the rear end thereof so as to be obliquely disposed relative to the front cross member in top plan view, and the front cross member and each of the floor frames may be formed, respectively, with first and second flanges which are joined together with the front floor portion interposed therebetween, in a three-layer structure. Further, the front frames may be disposed to extend longitudinally and parallel to one another, and designed such that a distance between the respective rear ends thereof is approximately equal to a distance between the respective front ends of the floor frames (corresponding to aspect 14). In this case, the distance between the pair of laterally-spaced floor frames can be reduced as compared to a conventional arrangement. This is significantly advantageous in forming the front band-mounting portion at a desirable position. Further, the floor frames to be moved rearward during a head-on collision are received by the front cross member having a material-dynamically strong resistance against compressive and tensile forces. Thus, a load during a head-on collision can be received by not only the end gusset but also the front cross member. Furthermore, the respective flanges of the floor frames and the front cross member are joined together with the front floor portion, in a three-layer structure. This is desirable in reliably transmitting the impact load from the front frames to the front cross member. The oblique arrangement of the floor frames also makes it possible to reliably increase the entire length of the floor frames, as compared with a conventional arrangement where a pair of floor frames extend straight and parallel to the longitudinal axis of the automobile body. This is desirable in providing enhanced shock-absorbing function in the floor frames themselves. In addition, the front frames themselves are disposed in a conventional parallel arrangement. Thus, an engine (power train) can be mounted onto the front frames in a conventional manner without change.

This application is based on Japanese Patent Application Serial Nos. 2004-284894 and 2004-284895, filed with Japan Patent Office both on Sep. 29, 2004, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An underbody structure for an automobile, comprising:
   a floor panel which includes a front floor portion connecting a pair of laterally-spaced side-sills to one another and having a tunnel region extending longitudinally along the lateral center thereof, a rear kick-up portion extending upward from a rear end of said front floor portion, and a rear floor portion extending from an upper end of said rear kick-up portion rearward and approximately linearly;
   a pair of laterally-spaced floor frames disposed to extend longitudinally in such a manner as to interpose said tunnel region therebetween, and joined to a bottom surface of said front floor portion, each of said floor frames having an approximately reverse-hat shape in section, and a rear end extending up to the vicinity of said rear kick-up portion;
   a pair of laterally-spaced front frames each having a rear end joined to a front end of a corresponding one of said floor frames; and
   an end gusset connecting each rear end region of said floor frames and said rear kick-up portion from the exterior side of the automobile.

2. The underbody structure as defined in claim 1, wherein said end gusset is designed to close up each rear end opening of said floor frames.

3. The underbody structure as defined in claim 2, wherein said end gusset is designed to define a closed section in cooperation with said rear kick-up portion.

4. The underbody structure as defined in claim 3, wherein said end gusset has a front extension portion which protrudes frontward and has an approximately reverse-hat shape in section, said front extension portion being joined to each rear end region of said floor frames.

5. The underbody structure as defined in claim 4, which includes one or more cross members disposed to extend laterally so as to connect each of said side-sills and said tunnel region, and jointed to said front floor portion, wherein said front extension portion of said end gusset extends up to a specific one of said cross members located closest to said rear kick-up portion, whereby said front extension portion serves as a portion of each of said floor frames located rearward relative to said specific cross member.

6. The underbody structure as defined in claim 5, wherein a portion of each of said floor frames extending from its front end to a position joined to said front extension portion of said end gusset is formed of a high-tensile steel sheet, and said end gusset including said front extension portion is formed of an ordinary steel sheet.

7. The underbody structure as defined in claim 4, which includes a rear frame joined to a bottom surface of said rear floor portion, wherein said end gusset has a laterally-outer end region connected to a front end region of said rear frame, and a laterally-inner end region extending up to a base of said tunnel region.

8. The underbody structure as defined in claim 1, which includes:
   a pair of laterally-spaced rear frames each joined to a bottom surface of said rear floor portion; and
   a rear cross member connecting said rear frames to one another, said rear cross member being joined to each rear end region of said floor frames, whereby said rear cross member serves as said end gusset.

9. The underbody structure as defined in claim 8, wherein said rear cross member defines a closed section in cooperation with a front end region of said rear floor portion, said rear kick-up portion and a rear end region of said front floor portion.

10. The underbody structure as defined in claim 1, wherein said automobile is equipped with a fuel tank disposed rearward relative to said rear kick-up portion and under said rear floor portion, wherein said underbody structure includes a support band mounted thereto at both frontward and rearward positions relative to said fuel tank to extend frontward and rearward directions of the automobile so as to support said fuel tank from under said fuel tank, wherein said end gusset is provided with a front band-mounting portion to which a front end region of said support band is mounted.

11. The underbody structure as defined in claim 10, which includes:
   a pair of laterally-spaced rear frames each disposed to extend longitudinally and joined to a bottom surface of said rear floor portion at a position located laterally outward relative to said fuel tank; and
   a connection cross member disposed rearward relative to said fuel tank to connect said rear frames to each other, said connection cross member being provided with a rear band-mounting portion to which a rear end region of said support band is mounted.

12. The underbody structure as defined in claim 11, wherein:
   said end gusset is provided with two of said front band-mounting portions at laterally spaced positions corresponding, respectively, to said floor frames;
   said connection cross member is provided with two of said rear band-mounting portions at laterally spaced positions; and
   said support band includes first and second support bands corresponding, respectively, to said two pairs of front and rear band-mounting portions,
   wherein said first support band is mounted between one of said front band-mounting portions and one of said rear band-mounting portions located on the laterally opposite side thereof, and said second support band is mounted between the other front band-mounting portion and the other rear band-mounting portion, so that said first and second support bands are crossed to one another below said fuel tank.

13. The underbody structure as defined in claim 11, wherein:
   said end gusset is provided with two of said front band-mounting portions at laterally spaced positions corresponding, respectively, to said floor frames;

said connection cross member is provided with two of said rear band-mounting portions at laterally spaced positions; and said support band includes first and second support bands corresponding, respectively, to said two pairs of front and rear band-mounting portions, wherein said first support band is mounted between one of said front band-mounting portions and one of said rear band-mounting portions located on laterally the same side as that thereof, and said second support band is mounted between the other front band-mounting portion and the other rear band-mounting portion, so that said first and second support bands are disposed laterally spaced apart from and substantially parallel to one another.

14. The underbody structure as defined in claim 11, which includes a front cross member disposed to extend laterally so as to connect each of said side-sills and said tunnel region, and joined to a top surface of said front floor portion, wherein:

each of said floor frames is inclined laterally inward toward the rear end thereof so as to be obliquely disposed relative to said front cross member in top plan view;

said front cross member and each of said floor frames are formed, respectively, with first and second flanges which are joined together with said front floor portion interposed therebetween, in a three-layer structure; and said front frames are disposed to extend longitudinally and parallel to one another, and designed such that a distance between the respective rear ends thereof is approximately equal to a distance between the respective front ends of said floor frames.

15. The underbody structure as defined in claim 3, which includes:

a pair of laterally-spaced rear frames each joined to a bottom surface of said rear floor portion; and a rear cross member connecting said rear frames to one another, said rear cross member being joined to each rear end region of said floor frames, whereby said rear cross member serves as said end gusset.

* * * * *